US008745561B1

(12) United States Patent
Garg et al.

(10) Patent No.: US 8,745,561 B1
(45) Date of Patent: Jun. 3, 2014

(54) SYSTEM AND METHOD FOR COMMON PATH PESSIMISM REDUCTION IN TIMING ANALYSIS TO GUIDE REMEDIAL TRANSFORMATIONS OF A CIRCUIT DESIGN

(71) Applicant: Cadence Design Systems, Inc., San Jose, CA (US)

(72) Inventors: Vibhor Garg, Union City, CA (US); Krishna Belkhale, Saratoga, CA (US); Pawan Kulshreshtha, San Jose, CA (US); Hakan Yalcin, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/957,373

(22) Filed: Aug. 1, 2013

Related U.S. Application Data

(60) Provisional application No. 61/800,325, filed on Mar. 15, 2013.

(51) Int. Cl.
*G06F 17/50* (2006.01)

(52) U.S. Cl.
CPC ........ *G06F 17/5031* (2013.01); *G06F 17/5081* (2013.01); *G06F 17/5059* (2013.01)
USPC ........... 716/113; 716/108; 716/134; 716/136; 703/16

(58) Field of Classification Search
CPC ............ G06F 17/5031; G06F 17/5081; G06F 17/5059
USPC ...................... 716/113, 108, 134, 136; 703/16
See application file for complete search history.

(56) References Cited

U.S. PATENT DOCUMENTS

| 3,761,888 | A | * | 9/1973 | Flynn | 710/18 |
| 6,150,866 | A | * | 11/2000 | Eto et al. | 327/297 |
| 7,448,015 | B2 | * | 11/2008 | Ja et al. | 716/126 |
| 7,523,426 | B2 | * | 4/2009 | Dirks et al. | 716/113 |
| 7,657,855 | B1 | * | 2/2010 | Manaker et al. | 716/113 |
| 7,870,528 | B2 | * | 1/2011 | Ja et al. | 716/126 |
| 8,205,183 | B1 | * | 6/2012 | Goh et al. | 716/126 |
| 8,539,407 | B2 | * | 9/2013 | Dirks et al. | 716/108 |
| 2006/0230373 | A1 | * | 10/2006 | Dirks et al. | 716/6 |
| 2007/0271542 | A1 | * | 11/2007 | Ja et al. | 716/12 |
| 2008/0270966 | A1 | * | 10/2008 | Ja et al. | 716/12 |
| 2009/0150846 | A1 | * | 6/2009 | Dirks et al. | 716/6 |
| 2012/0240090 | A1 | * | 9/2012 | Shirai et al. | 716/113 |
| 2013/0346932 | A1 | * | 12/2013 | Dirks et al. | 716/108 |

FOREIGN PATENT DOCUMENTS

JP         2011096014 A   *   5/2011

* cited by examiner

*Primary Examiner* — Phallaka Kik
(74) *Attorney, Agent, or Firm* — Rosenberg, Klein & Lee

(57) ABSTRACT

A system and method are provided for common path pessimism removal or reduction (CPPR) in a timing database provided to guide transformative physical optimization/correction of a circuit design for an IC product to remedy operational timing violations detected in the circuit design. Pessimism is reduced through generation of a common path pessimism removal (CPPR) tree structure of branching nodes, and operational timing characteristics of each node. The CPPR tree structure is used to avoid exponential phases propagating in an exploratory manner through the system design, as well as the resultant memory footprint thereof. Additionally, back-tracing node-by-node through the circuit design for each and every launch and capture flip flop pair end point through each possible path thereof is avoided.

20 Claims, 12 Drawing Sheets

SYSTEM AND METHOD FOR COMMON PATH PESSIMISM REDUCTION IN TIMING ANALYSIS TO GUIDE REMEDIAL TRANSFORMATIONS OF A CIRCUIT DESIGN

RELATED APPLICATIONS

This Application is a Non-provisional Patent Application of U.S. Provisional Application 61/800,325 filed 15 Mar. 2013, now pending.

BACKGROUND OF THE INVENTION

The present invention is generally directed to electronic design automation (EDA) for creating integrated circuit (IC) products, such as, for example, system on-chip (SOC) IC products and the like. More specifically, the present invention is directed to providing expeditious timing sign-off verification and correction with minimal fixing and minimal engineering change order (ECO) looping during sign-off of a physical circuit design. In certain applications, the present invention is directed to common path pessimism removal (CPPR) in a timing database to guide optimizer transformations of the circuit design to remedy timing violations detected therein.

While signoff systems and methods are known, such heretofore known systems and methods are encumbered by numerous deficiencies, not the least of which are required repeated transformative iterations between timing signoff and physical implementation/optimization. Other deficiencies include highly divergent timing analyses between timing signoff and physical implementation optimizers—which lead to overly pessimistic timing characteristics and attendant false-positive violations (requiring over-fixing of the circuit design), inordinate turn around time, and overly burdensome storage, processing, and memory requirements. Such deficiencies have heretofore hindered efforts to minimize circuit product fabrication costs, time to market, power requirements, and substrate area while maximizing performance.

There is therefore a need for a system and method for pessimism reduction in timing analysis to guide remedial transformations of a circuit design. There is a need for such system and method which reduce undesirable effects like underclocking or over-fixing due to unwarranted remedial physical corrections of the circuit design for false-positive timing violations of constraints stemming from inadequate CPPR from the circuit design.

SUMMARY OF THE INVENTION

It is an object of the present invention to provide a system and method for guiding remedial transformations of a circuit design defined by physical implementation data to reduce unwarranted physical corrections for false-positive violations stemming from common path pessimism in the circuit design.

It is another object to provide improved correlation between a signoff timing analysis module and a physical implementation module to reduce repeated iterations therebetween and provide expeditious timing signoff thereby.

It is a further object to provide improved timing information for a circuit design with reduced common path pessimism to guide the remedial corrections thereof.

These and other objects are attained in a method for pessimism minimization in timing delay analysis for a pair of devices clocked according to a common clock root in a circuit design. The method includes generating a timing model for the circuit design having a clock root and a plurality of clocked devices respectively coupled thereto by a plurality of interconnection points and at least one intermediate circuit component. At least a first and second of the clocked devices are paired in actuation for launch and capture of a data signal therebetween. A first path is defined between the clock root and the first clocked device and a second path is defined between the clock root and the second clocked device. A lineage tag is generated for at least one interconnection point determined to be a branching point, a branching point being defined by an interconnection point having a plurality of incoming or outgoing path segments. At least one of the lineage tags indicates a history of intervening branching points traversed by the first and second paths between the clock root and a corresponding branching point. At least one common path portion shared between the first and second paths is determined based upon a comparison of at least one lineage tag from each of the first and second paths. A timing delay parameter is selectively set for at least one of the first and second clocked devices compensated for the common path portions shared between the first and second paths, the timing delay parameter indicating a signal propagation delay, whereby common path delay pessimism is avoided for the paired clocked devices.

A method for common path pessimism minimization of timing delay parametric data for a memory device pair of a circuit design includes establishing at least one processor coupled to a memory, the memory storing circuit design data for a circuit defined by a plurality of circuit components including at least one clock root, at least one branching point, and at least one memory device pair. The circuit components being coupled together by a plurality of interconnecting path segments therebetween. The branching point is defined by an interconnection point having a plurality of incoming or outgoing path segments. The processor is executed to generate a timing model based on the circuit design data. The timing model includes at least one acquired timing delay differential parameter for a predetermined set of circuit components of the circuit design including at least the memory device pair. The timing delay differential parameter indicating a signal propagation delay difference for a signal traversing path segments between the clock root and the corresponding circuit components. A lineage tag for each branching point is generated where at least one of the lineage tags include an indication of a plurality of branching points respectively disposed on a plurality of path segments extending from the corresponding branching point to the clock root. A least one common branching point is identified in at least two lineage tags associated with the memory device pair. The timing delay differential parameter data of the memory device pair is selectively adjusted according to the identified common branching point, whereby delay pessimism is removed for said memory device pair.

A system for expeditious pessimism minimization in timing analysis for a pair of devices clocked according to a common clock root in a circuit design includes a timing model generator executing to generate a timing model for a circuit design having a clock root and a plurality of clocked devices respectively coupled thereto by a plurality of interconnection points and at least one intermediate circuit component, at least a first and second of said clocked devices being paired in actuation for launch and capture of a data signal therebetween. A first path is defined between the clock root and the first clocked device and a second path is defined between the clock root and the second clocked device. The timing model generator acquires a timing delay parameter for each of a predetermined set of interconnection points of the circuit design. The timing delay parameter indicating for each interconnection point a signal propagation delay contribution for a signal traversing a path segment extending from the clock root to the corresponding interconnection point. The timing model generator generates a lineage tag for at least one interconnection point determined to be a branching point, where a branching point is defined by an interconnection point having a plurality of incoming or outgoing path segments. At least one of the lineage tags indicates a history of intervening branching points traversed by the first and second paths between the clock root and a corresponding branching point. A common ancestor identification module is coupled to the timing model generator. The common ancestor identification module is actuated to determine at least one common path portion shared between the first and second paths based upon a comparison of at least one lineage tag from each of the first and second paths. A common path pessimism reduction module is coupled to the common ancestor identification module. The common path pessimism reduction module selectively sets a timing delay parameter for at least one of the first and second clocked devices compensated for common path portions shared between the first and second paths, said timing delay parameter indicating a signal propagation delay, whereby delay pessimism is avoided for the paired clocked devices.

Additional aspects and details will be set forth in the description which follows and, in part, will be apparent from the Description and Figures.

DETAILED DESCRIPTION OF THE PREFERRED EMBODIMENTS

Figure 1:
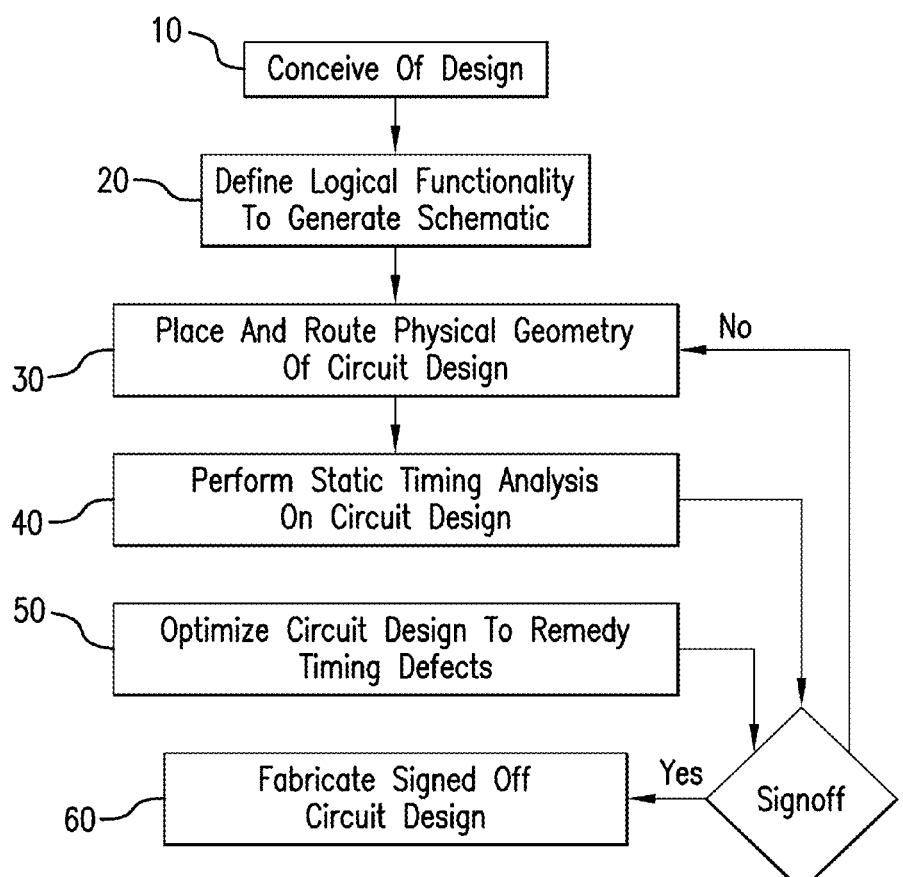
FIG. 1 is a flow diagram illustrating an exemplary conventional electronic design automation (EDA) design flow beginning with a conceived design and culminating in a physical, tangible, operable, fabricated device.

The subject system and method generally provide measures for removing undue pessimism or conservatism from a timing database resulting from a static timing analysis (STA) of a circuit design. The subject system and method serve to thereby remove unwarranted timing violation detections and reduce corrective physical transformations ordered for the circuit design.

Along an electronic design flow, for example, an electronic design automation (EDA) flow, a circuit design is conceived and elaborated typically through numerous computer-aided stages to arrive at a physical circuit design layout. The layout defines actual coordinates and physical geometries for each component of the given circuit design and interconnections therebetween for ultimate fabrication as an operable, tangible, IC product.

An exemplary electronic design automation (EDA) flow traverses recursively through a plurality of stages towards the actual fabrication of complex integrated circuit devices, micro chips, and systems. Device designs as small as a microcontroller in a hearing-aid to devices as large as a very complex system on chip (SOC) including a plurality of processing cores coupled to an on-chip memory and input/output interfaces (I/O) are extensively planned out, verified, and remedially modified/transformed iteratively to ultimately arrive at a physical device for fabrication.

At first, an engineer or designer conceives a new circuit design, qualitative functionality, or device. This concept is then mapped out into logical schematic data defining a qualitative view of the functional goals for a device and interconnections amongst components thereof.

A physical layout implementation stage builds upon such logical schematic abstraction of the data design to generate data specifying how such logical schematic may actually be implemented physically. A physical layout is generated by placement and routing steps to include geometries and placement coordinates of components such as gates, buffers, registers, flip-flops, and all manner of electrical integrated circuit structures along with routing interconnections between these components.

Further data abstractions, such as a mask pattern, which are formed to guide fabrication of the physical device embodying the circuit design, may be included in the circuit design data as well. The totality of all the physical implementation data abstractions plus extrinsic data may collectively define the circuit design—though individual abstractions, such as the schematic or layout may be referred to herein as the circuit design, based on context, for clarity and brevity.

The placement and routing steps allocate the placement for individual components of the circuit design on a semiconductor substrate, such as silicon, germanium, or the like, with actual physical geometries and a physical coordinate-mapped organization reflecting how the circuit design will be actually fabricated on the silicon substrate by optical lithography or other such fabrication measures. The routing portion seeks to interconnect each of the individual components (such as AND gates, OR gates, buffers, and the like) to allow data signals, clock signals, or power to pass therethrough, thereby defining a path containing a set of segments between nodes through the circuit design.

Once a physical layout has been generated, a number of extensive verification checks and analyses are performed in a signoff stage to ensure that the physical implementation of both the initial concept and the logical design meet the design goals, rules, and constraints thereupon, and functions as expected. In signoff, one such verification is the static timing analysis (STA) which performs input-agnostic operational timing analyses on the circuit design. Each and every path from each input to each output of the circuit design is exhaustively exercised. The exhaustive timing analysis exercises each and every path through the circuit, regardless of whether it will actually be utilized during the circuit's operation.

Throughout the analysis of the circuit design, a set of required times are determined based in part upon user-specified constraints, and also based upon required synchronization between sequential components such as flip flops, registers, latches, and the like. For example, a launch and capture flip flop pair is expected to transmit a data element on a clock edge from the launch to the capture flip flop. In this regard, implied constraints beyond those explicitly defined exist due to the high degree of coordination required to synchronize launching flip flop, clock, and capturing flip flop. The capture flip flop must be ready and waiting for the launching flip flop to send the data item thereto for a successful transfer of data from launching flip flop to capture flip flop. For a given IC device to function as intended, all such timing constraints must be met.

A timing graph is defined by a plurality of nodes (where each node represents a pin, terminal, or port along a gate or component in the circuit design), and edges connecting nodes (where the edges represent interconnects between pins). A clock timing signal is propagated from a clock root, which may, generally, be a begin-point, leftmost, or most upstream node in the timing graph (aside from primary inputs). This clock timing signal is assumed to propagate through each and every connected path segment of a corresponding clock network in a static timing analysis, arriving at each node at a certain time after departure from the clock root. Each of the arrival times of the signal at the nodes, amongst other characteristics, are measured and recorded to determine a delay at each node throughout the circuit design.

The arrival time of the clock timing signal at each node is compared against the required time as determined by the explicit definitions of timing constraints and implied constraints due to such requirements as, for example, the launch and capture flip flop pair synchronization discussed above. To ensure that all timing constraints are met and that the chip operationally performs in the timing domain such that data, where required, is passed on in accordance with the corresponding clock, a certain amount of pessimism, conservatism, or over-estimation is involved in the static timing analysis. Not only is the actual time reported, but generally a worst case and a best case for each arrival time defining a range of arrival times are computed for each node in the circuit design. The required times are also generally computed in terms of worst case arrival and best case arrival. To be safe, the worst arrival times are generally compared with corresponding best required times.

Moreover, at multiple fan-in elements, such as an AND, OR, NOR, XOR, and the like, generally the fan-in pins or inputs are evaluated one relative to the other to determine the worst possible delay (irrespective of actual logical functionality) amongst any of the fan-in cone pins. This worst possible delay or arrival time is then propagated forward to the fan-out pin for further propagation throughout the circuit. Many other cases of pessimism, conservatism, or safe ranges are typically built into a static timing analysis. The pessimism thus aggregates throughout such analyses of the circuit design.

Each node in the circuit design that has an actual arrival time of the clock timing signal which is later than the required time for that signal at the node is considered to have a negative slack time. Slack time is defined herein as the difference between observed and required times. Slack time indicates the amount of tolerance, additional margin, or cushion where a signal can be modified to arrive later and still meet the required time—perhaps to allow another signal to arrive on time. Conversely, a negative slack time indicates that the signal arrives after the required time and thus a timing violation is said to exist at each and every negative slack determined at the nodes in the circuit design.

Each timing violation in the circuit design must, generally, be fixed before the circuit design is actually physically fabricated into a physical, tangible, operable integrated circuit (IC) product. Otherwise, a defective product and the ramifications thereof, including loss of goodwill, recall, and replacement costs, may be unavoidable. Thus, each timing violation requires a corrective action to modify the circuit design such that violations are remedied. The corrective action generally modifies the circuit design to include additional gates, remove unnecessary gates, resize gates, such as an AND, NOR, buffer, or the like, to either reduce or increase delay across the gate. If no suitable solutions or fixes may be employed, certain tradeoffs may be unavoidable. In some cases, for example, the maximum operational frequency of the chip may require reduction. For instance, a timing violation may be found to exist at 2 GHz clock speed for an IC product; however, reducing this speed to 1 GHz, while losing substantial processing power, may alleviate or remove the timing violation and allow for a functional product, albeit at a drastically reduced performance.

When fixing a timing violation, by for example adding a gate or otherwise transforming the circuit design, such fixing may lead to an exponential explosion of additional problems or violations created due to the modification of the circuit design. Such additional problems, violations, and the like require further fixing, further corrective action, and further verification through such measures as static timing analysis (STA). Thus, it is seen that transformatively correcting the circuit design or lowering the operational frequency are preferably avoided.

Yet, undue aggregation of pessimism often leads to additional detected timing "violations" which may not actually exist, leading to a repetitive loop of unnecessary fixing, verifying, re-fixing, and re-verifying of the circuit design. This repetitively looped fixing/verifying results in substantial added delay, cost, and a suboptimal IC product. Such IC product may have additional gates or modifications which were added merely to address anticipated problems which may not have actually existed, but were anticipated through an overly cautious or unduly pessimistic analysis. The "fixing" generally results in IC products with higher power drain, slower operational frequencies, larger circuit footprint, increased cost, and delayed fabrication. Therefore, a preferred approach is to remove unwarranted pessimism to alleviate, if not avoid, the pitfalls of repetitively looped fixing, optimizing, and verifying steps.

A significant portion of the pessimism introduced into a timing database may be attributed to additional pessimism built-in to address sequential logic pairs, such as, for example launch and capture flip flop pairs. This particular type of pessimism may be safely removed, in-part, due to the fact that the launch and capture pair share a portion of a common path from the clock root to the launch and capture flip flops.

In static timing analysis, it is assumed that the launch flip flop has a separate path to the clock root than the capture flip flop. Thus, the two separate paths for launch and capture respectively have pessimism on the minimum and maximum arrival times at each of the flip flops. However, it may be seen that if a launch and capture flip flop share at least some portion of their clock path, then the common path may not possibly be both late and early simultaneously, and therefore have some additional undue pessimism. Thus, a portion of the pessimism may be removed by identifying the segments of the common path for each launch/capture pair throughout the circuit design. If this pessimism is not removed, then the fabricated IC product may have a larger footprint than necessary, requiring more semiconductor substrate, and increasing cost. Power requirements and drain will likewise increase as each new gate adds a new additional drain on power. Consequently, operating frequency may need to be reduced, yielding a reduction in the performance of the IC product. While the marginal decreases in performance, power efficiency, and effective use of the substrate area may be relatively small for each chip, the losses and inefficiencies, in the aggregate, may be considerable for a production run of an IC product based on the design (being fabricated potentially tens of millions of times).

As seen in the illustrative Electronic Design Automation (EDA) flow diagram of FIG. 1, a design idea is conceived of at block 10. A team of circuit designers, with the aid of computer systems and EDA tools, then seek to refine the conceived design idea to define logical functionality and generate a logical schematic of the circuit design at block 20. The largely qualitative logical schematic design generated at block 20 is then further refined or elaborated upon to define specific physical geometry and coordinates of each individual gate or element of the design with interconnects defined therebetween at block 30. Block 30 results in the generation of a physical layout of the circuit design. At block 40, the circuit design is signed-off by performing a battery of static timing analyses on the circuit design to ensure proper operational timing thereof. The exemplary static timing analyses may involve a plurality of assumptions which reduce accuracy in a conservative manner to indicate false positive violations where actual violations may not exist or may not be as severe as determined.

After performing the static timing analyses on the circuit design, a set of nodes and their resultant operational timing characteristics are passed on to the physical circuit optimizer to remedy, in a transformative manner, the timing defects as discussed above by insertion, deletion, or modification of gates in the circuit design at block 50. Modifications to the circuit design are generally made by edits to the netlist data. Upon conclusion of the execution of block 50 and the optimization or remedial transformation of the circuit design, a final signoff, such as a static timing analysis is performed at block 40. Such optimization and verification generally loop iteratively until all violations are resolved. Upon completion of signoff and verification, the circuit design is passed at block 60 to be fabricated as fully signed-off. At block 60, a number of additional processes may be performed such as optical resolution enhancement, tape out, and the like. This results in a fully fabricated, physical, tangible, and operable physical product implementing the circuit design.

Figure 1A:
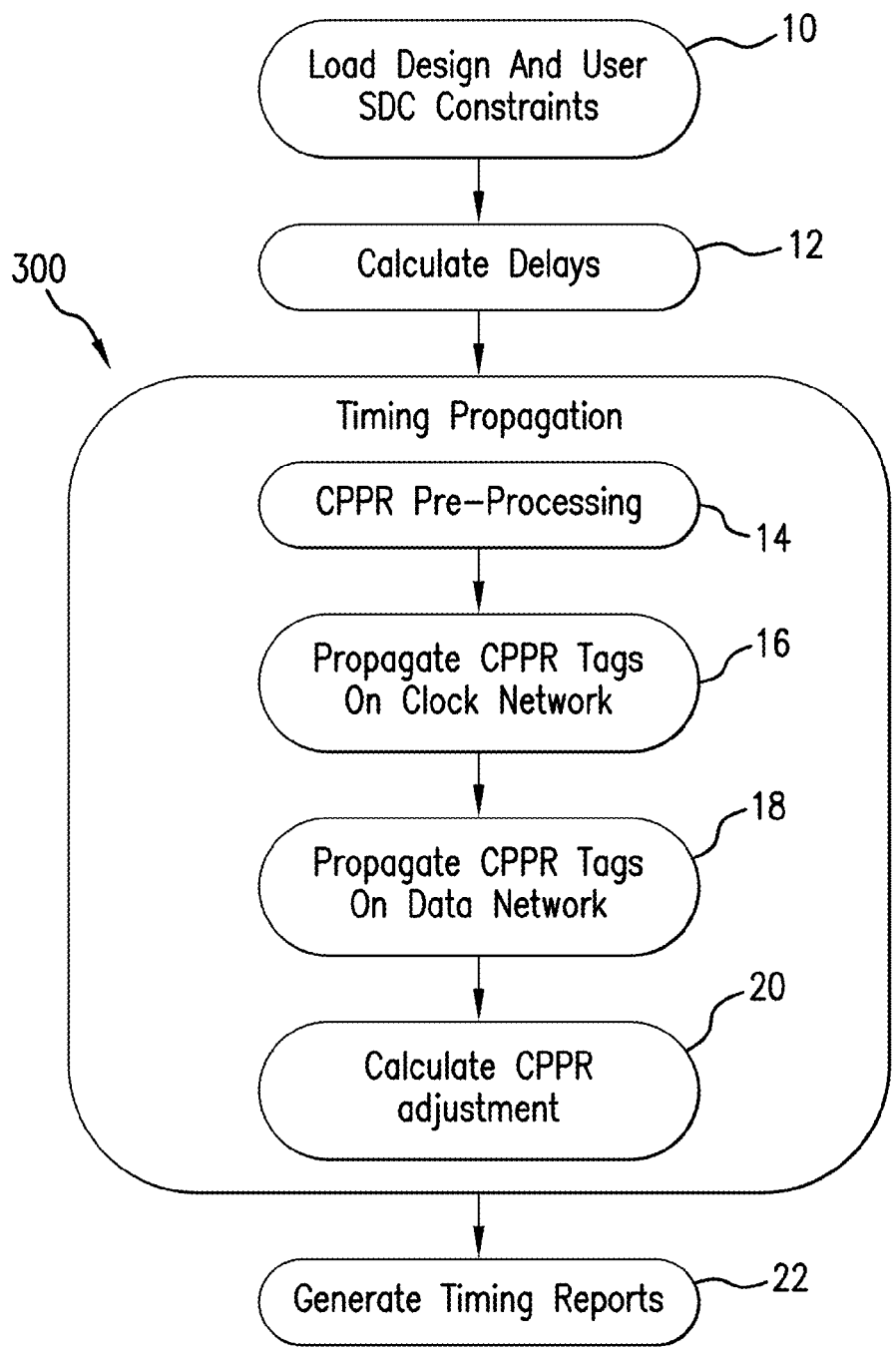
FIG. 1A is a flow diagram illustrating an exemplary flow of common path pessimism removal (CPPR) for guiding remedial transformations of a circuit design defined by physical implementation data to reduce physical corrections for apparent violations detected in the circuit design in accordance with an exemplary embodiment of the present invention.
Figure 1B:
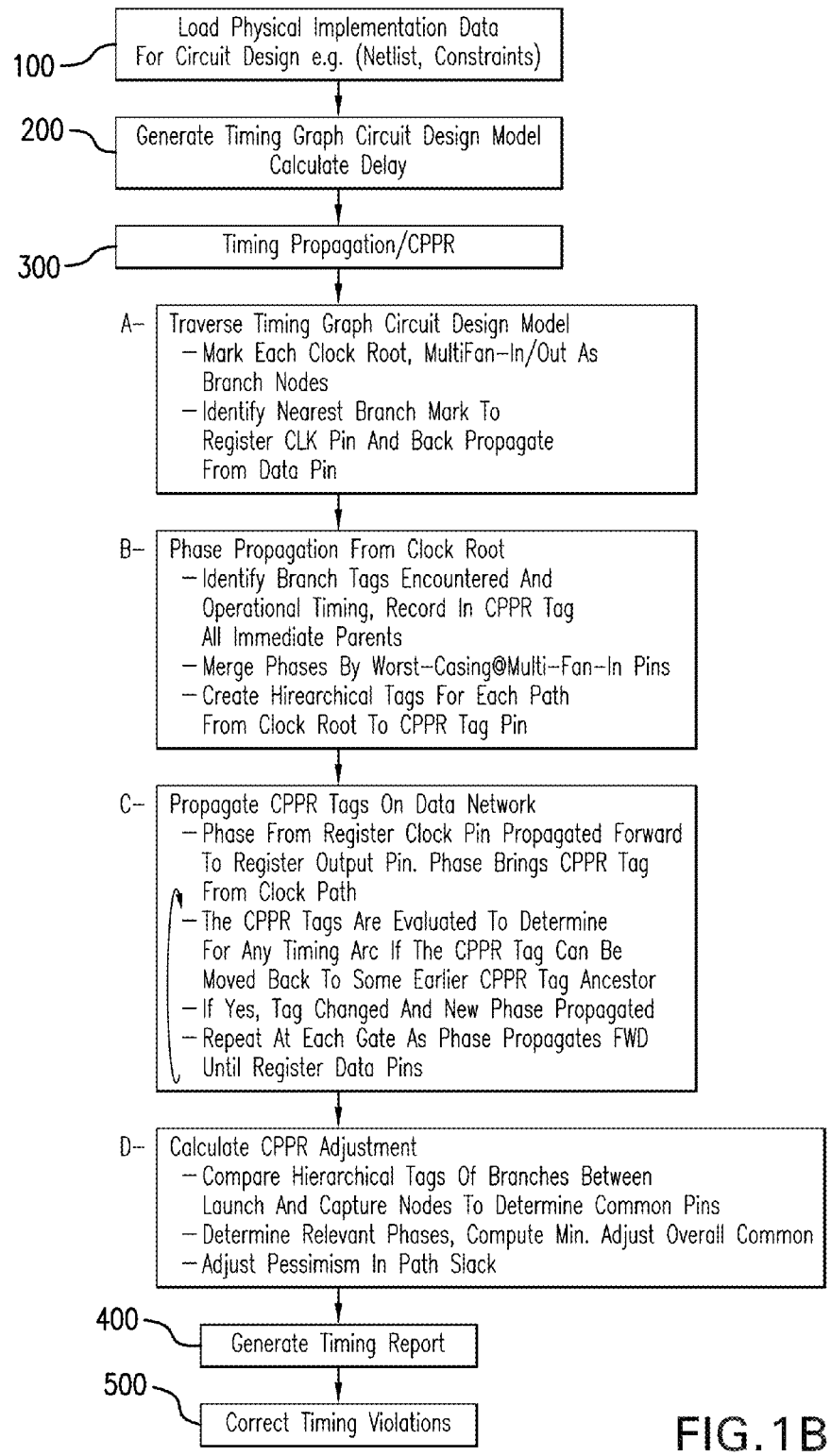
FIG. 1B is a yet more detailed flow relating to FIG. 1A illustrating a common path pessimism removal (CPPR) flow for removing pessimism added during the static timing analysis (STA) where the added pessimism is due to a common clock path between synchronized memory elements in accordance with an exemplary embodiment of the present invention.
Figure 1C:
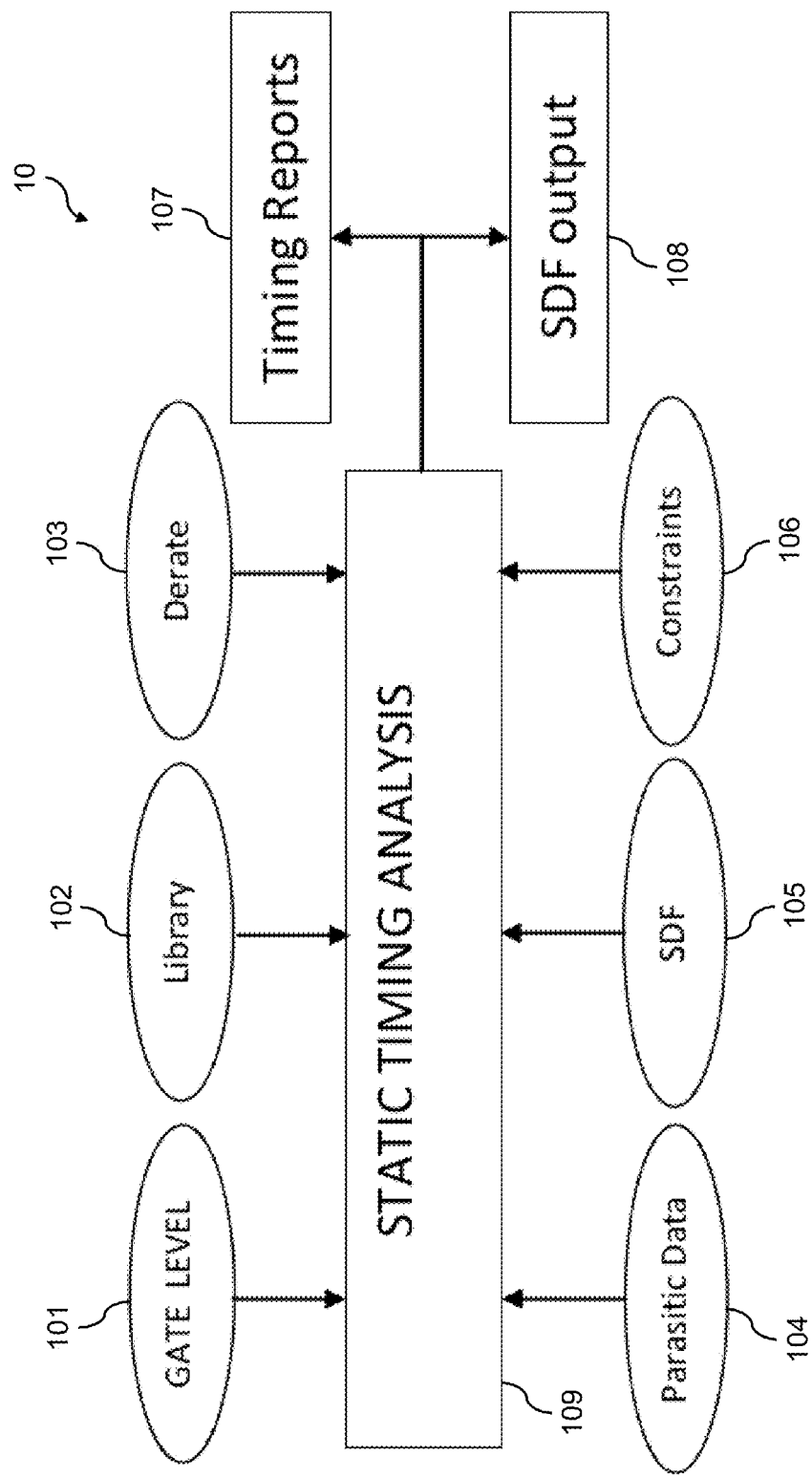
FIG. 1C is an illustrative flow diagram illustrating the conventional gathering of input data into the static timing analysis (STA) for building a timing graph of the circuit design.
Figure 1D:
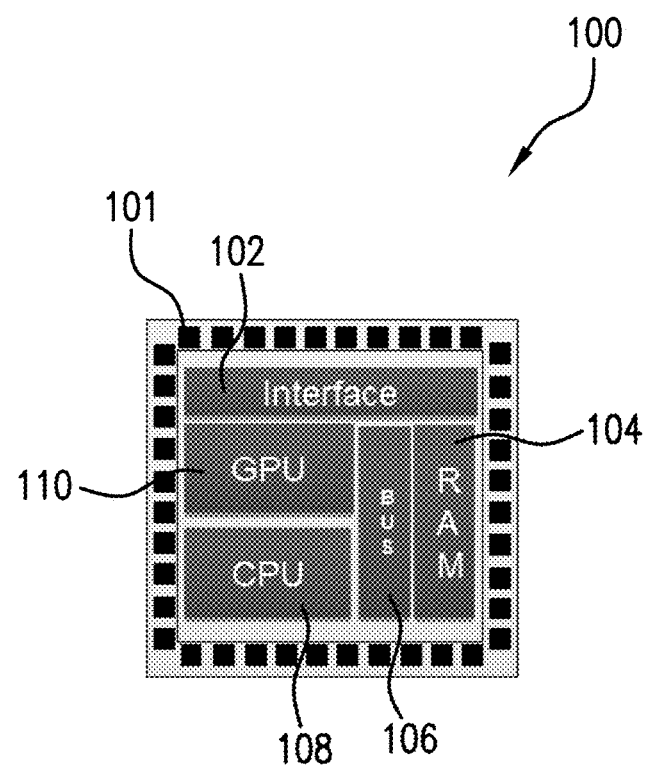
FIG. 1D is a simplified block diagram of a conventional exemplary circuit design representing a processor-based system on chip (SOC) integrated circuit (IC) product.

As seen in the schematic diagram of FIG. 1D, a simplified exemplary circuit design 100 of such a physical product is shown. In this instance, a system on chip (SOC) including a plurality of interface pins 101 is shown. A central processing unit (CPU) 108 is coupled via a bus 106 to a memory module 104 which is shown as a random access memory (RAM). The CPU 108 is additionally coupled to a graphics processing unit (GPU) 110, and the circuit design 100 also includes an interface 102 meant for interfacing with external peripherals and hosts. The exemplary circuit design 100 illustratively shown is a highly simplified graphical representation of an exemplary system on chip (SOC) design. The actual circuit design may comprise upwards of potentially tens to hundreds of millions of instances where each instance may be defined by a plurality of logical gates or components, such as AND, OR, NOR, XOR, gates and the like, arranged upon a semiconductor substrate to implement a plurality of logical functions such as, for example, an adder, arithmetic logic unit (ALU), floating point unit (FPU), and the like. While FIG. 1D shows a highly simplified graphical representation of the circuit design, such circuit design may include a plurality of different data abstractions such as a logical representation (also referred to as a schematic), which maintains a qualitative component list and interconnections between these components and some degree of connectivity information. Additionally, a physical implementation abstraction (also referred to as a layout) includes a more fully elaborated representation of the circuit design whose components and interconnections have been placed and routed accordingly. The physical layout generally includes an actual coordinate-map of absolute physical locations of all of the components of the circuit design on a semiconductor substrate and specific geometric representations of the components compared with merely relative locations in a logical schematic. Additionally, interconnective routing and the precise paths for electrical impulses and signals to follow between components throughout the circuit design are also more fully detailed within the physical layout.

To recap, as seen in FIG. 1, an exemplary electronic design automation (EDA) flow is shown. A circuit design starts with a design idea at block 10 which may be a seed of a design conceived by a team of circuit designers to address a need. Such logical schematic of the circuit design more fully elaborates a designer's idea and seeks to capture the abstracted logic and qualitative properties required to implement the idea. Once a logical schematic has been completed, flow proceeds to block 30 where routing, component placement and timing, parasitic optimization, and the like are performed to arrive at an optimum (or at least workable) arrangement of components on a substrate to meet a plurality of design rules, constraints, and goals while at the same time faithfully reproducing the logical functionality of the logical schematic created at block 20.

Between blocks 40 and 50, an iterative loop of performing static timing analysis signoff on the circuit design at block 40 and optimizing the circuit design at block 50 in a transformative manner to remedy any timing defects is exhaustively performed. Once the repetitive loop between signoff and optimization has completed, the circuit design, such as seen in FIG. 1D, for example, is then fabricated into a an operable integrated circuit product characterized by the circuit design data.

The signoff static timing analysis is performed to carry out exhaustive timing tests on the circuit design to ensure that the given circuit design is correct and will work as desired. At this stage, a number of inputs are provided to the circuit design and a respectively corresponding number of outputs are verified to arrive at a certain time. The timing analysis is run exhaustively and in atomic detail on each and every gate, component, and/or path throughout the entirety of the circuit design. Typically, the timing analysis and the timing signoff must be performed more than once for each representative view of the circuit design (where a view denotes a unique permutation of operational corners for each of semiconductor process, voltage, and temperature variations, and modes). Therefore, timing signoff tends to be a very time, processing, and memory intensive process.

As seen in FIG. 1C, the gate level netlist definition of the circuit design 101 is incorporated via loading or reading into the static timing analysis 109. The standard cell timing library 102 is also incorporated into the static timing analysis 109 to build a model of the circuit design, such as a timing graph, where each component pin is represented as a node of the timing model and each interconnect is represented by a path segment (timing arc, edge or link) between nodes. Additionally, the various static timing analyses may accept, as inputs for various sub-analyses or responsive to configured options for execution, a number of data sources representing various aspects of the circuit design, including, for example: derating factors 103, parasitic data 104, standard delay format data (SDF) 105, and constraints or requirements 106. After the data inputs 101-106 are inputted to the static timing analysis 109, the timing graph model of the circuit design is built to include the data elements 101-106. The static timing analysis is then executed to analyze the timing graph of the circuit design which generates standard delay format (SDF) as output at block 108 along with timing reports 107, such as a timing database. The timing reports 107 may be used in further analysis and violation remediation downstream, such as in the optimizer portion executing to modify the design to address violations.

Figure 2:
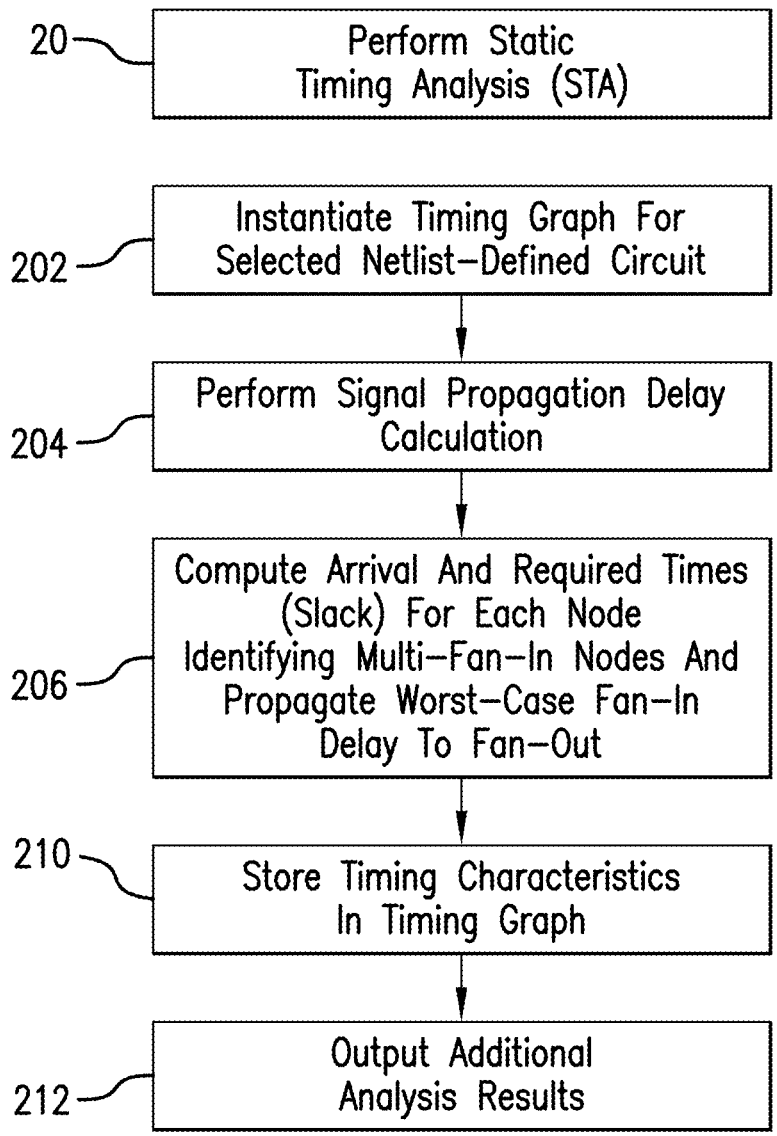
FIG. 2 is an exemplary flow diagram illustrating a conventional flow through a static timing analysis (STA)

As seen in FIG. 2, an illustrative static timing analysis (STA) flow is shown. At block 202, a timing database is instantiated for the selected netlist-defined circuit. In other words, a timing database is created, memory is reserved for it according to the netlist-defined circuit for the topology, and initialization procedures are executed. Flow proceeds to block 204 where a signal propagation delay calculation is performed to determine arrival of required times for each node throughout the netlist-defined circuit design. At block 206, arrival and required times are computed for each node to determine the slack thereof (slack being defined as the required time minus the arrival time at a particular node). Components having multiple fan-in nodes, such as, for example, AND, OR, and NOR gates, are identified. The multiple fan-in nodes of a logical gate such as an AND gate are compared relative to each other to determine amongst the fan-in pins thereof, the pin that would incur the worst potential delay, slew, and other operational timing characteristics. The delay and slew from the worst possible fan-in pin is then propagated downstream to the fan-out of the given logic gate (containing the multiple fan-in nodes). In such manner, a worst-case analysis is performed, and the output is attributed with the worst potential input thereto.

While such approach incorporates additional pessimism at the cost of strict accuracy, if the node having the worst possible fan-in delay meets the timing requirements, then it may be safely presumed that the remainder of the fan-in nodes also meet the timing requirements thereupon; and, computation time, size, and expense may all be correspondingly reduced—though increased pessimism is introduced. At block 210, the operational timing characteristics determined for each node based upon the parameters of the static timing analysis are written to the timing database instantiated at block 202 to thereby generate a fully populated timing database including the entirety of the netlist-defined circuit design. At block 212, additional analysis results from the STA may be output for other peripheral uses by circuit designers, signoff engineers, and other downstream processors.

As seen in the illustrative flow diagram of FIG. 1A, the static timing analysis (STA) at block 10 loads design and user constraints in, for example, a synopsis design constraints (SDC) file though any suitable file for storing constraints data may be employed. The static timing analysis builds a timing graph of the circuit design based upon the netlist data (as discussed above) and other constraints input at block 10. The timing graph of the circuit design or portion thereof that the user has specified at block 10 is preferably a topological entity defined by nodes (representing pins of components) and edges (representing interconnections therebetween).

At block 12, the timing graph for the topological structure of the circuit design defined by the netlist input in block 10 is then analyzed in accord with static timing analysis (discussed above) to determine delays therein. Delays are determined by a required time for a signal which may be predefined in the SDC input at block 10 to determine a required arrival time of the signal. Additionally, the actual arrival time of the signal at a certain node is compared against the signal's required arrival time to determine either a positive or negative slack time. A positive slack time allows for certain tolerance by which the signal may be delayed and still meet the required time. Conversely, a negative slack indicates excessive delay and a corresponding timing violation.

When performing a static timing analysis of a circuit design, additional pessimism is conservatively allowed to ensure that even in the worst possible case all timing requirements are met, and the circuit functions as designed. For example, additional pessimism is employed by default when a static timing analyzer executes upon a circuit design having sequential logic—such as one where a launch and capture flip flop pair are tied to a common clock line with at least one common node disposed intermediately between a clock root and the launch and capture flip flops. This is due to the fact that a launch and capture flip flop pair requires a high degree of coordination and synchronicity in timing to ensure that a signal propagates correctly therethrough. More specifically, it is essential that data is set up and made ready for transmission and reception at the capture flip flop when a clock edge arrives.

A large part of the pessimism in the timing data is due to such launch and capture pairs and the pessimism inherently built in to account for the timing intricacies of such pairs throughout the circuit design. Accordingly, removal of this pessimism while retaining accurate timing data is of great import.

Thus, as seen at flow 300 of FIG. 1A, a static timing analysis utilizing common path pessimism removal (CPPR) is shown. At block 14, a CPPR pre-processing step is undertaken whereby the timing graph of the circuit design constructed from netlist data at block 10 is traversed in a left to right or upstream to downstream manner. A branch tag or other suitable marker is appended to each identified clock root, multiple fan-in pin, and multiple fan-out pin. Preferably, the marker is appended by creating a branch tag data structure and associating it with a node of the timing graph. Additionally, the nearest branch tag on the register clock pin for a launch or capture flip flop is propagated back from the corresponding register data pin for subsequent use at block 18. Such backward propagation is done as part of block 14, FIG. 1A.

At block 16, the CPPR tags are created and propagated through the clock network. CPPR tags in various exemplary embodiments herein are established to allow for the recordation of a single parent, set of parents, or a history including a chain of ancestors along a path from the clock root to the node for a given node. For example, a CPPR or lineage tag for a node C may have data fields such as, for example: "Parent=A", "Parent=A, B1, B2", or "A1, B1, C1, D1, E1, . . . ." and the like. An ancestor node refers to a node that lies upstream from an evaluated node along a path from either a clock root or an input to the instantly evaluated child node C. A, B1, and B2 are ancestor nodes for node C in the above example. A parent refers to an upstream ancestor node, or more specifically the node immediately preceding the instant node. The instant node therefore receives a signal from the parent node and a signal traverses from a clock root along ancestor nodes to arrive at a child node.

A phase refers to a programmably established data object employed to propagate through the timing graph of the circuit design. Each phase maintains timing information and measures accounting for different domains of each clock throughout the circuit design. A phase propagates from the leftmost or upstream clock root and processes branch tags that it encounters along a path that it takes by reading, storing, and writing CPPR tags (also referred to as lineage tags in certainly exemplary embodiments herein). For example, if a phase encounters a branch tag, then the phase records the branch tag in a CPPR tag and propagates the information therein further through the timing graph. Additionally, the phase may mark each branch that it encounters with such CPPR tag including a historical path of ancestors it encountered in traversing the timing graph from input to arrive at the branching node.

A phase is preferably established as a class object with data fields and member methods acting upon the data fields thereof in accordance with object oriented programming (OOP) principles. A CPPR tag may be stored as a struct data field of the phase object though any suitable data structure may be employed. Preferably, each CPPR tag maintains a plurality of pointers pointing memory locations of at least one branch tag associated with a node of the timing graph. Each CPPR tag or lineage tag in the exemplary embodiments herein points to at least one parent node and/or to each ancestor node thereof. Additionally, data fields may contain further classes, structs, pointers to memory addresses or objects, or certain predefined variable types, such as integer, floating point, strings, arrays, vectors, marker tags including branch and cppr tags, and the like. The task of propagating phases across timing arcs is preferably executed by an auxiliary class and other classes within the system predefined to traverse the timing graph or netlist data of a circuit design.

At block 18, the CPPR tags are propagated onto the data network. At block 20, the CPPR adjustment is calculated based upon the worst arrival time on the data pin and the best arrival time on the clock pin of a register. CPPR adjustment is determined by finding the common pin for launch and capture register pairs. One such exemplary measure for CPPR adjustment includes: For setup checks, the arrival time of a data signal at the capture register data pin is termed as an arrival time (AT). The arrival time of a clock signal at the capture register pin is termed as a required time (RT). Slack for the data signal is defined as the difference of required time and arrival time. The delay differential slack=RT−AT. Arrival times generally have undue added pessimism. Such pessimism may be removed by adjusting the arrival time, by adjusting the required time, by adjusting a delay differential slack, weighted coefficients, or any other suitable measures. For example, an adjusted slack delay differential may equal Slack=(RT+CPPR adjustment)−AT. Alternatively, Slack may equal RT−(AT−CPPR adjustment). For hold checks, the signs are reversed but follows the same general concept and improves slack in similar manner. Following the adjustment, a timing report is generated at block 22 for passage to the physical placement and routing optimizer to remedy any timing violations remaining in the timing report. Removing unwarranted timing violations from the timing report reduces the need for unnecessary addition of gates or other components for remedial transformation of the circuit design implementation.

Further detail is shown in FIG. 1B. To recap, the physical implementation data for the circuit design including the netlist, constraints (perhaps in a synopsis design constraint SDC) file, and the like are loaded at block 100. At block 200, a timing graph of the circuit design is generated primarily from the netlist data and optionally, other inputs from block 100. The timing graph includes a plurality of nodes, each representing a pin in the circuit design, such as, for example, pin Y of AND gate. Each of the nodes of the timing graph are connected to another node (based upon the netlist) via an edge. The edge represents an interconnect either between components or inside of a component, such as an AND gate. At block 200, each and every pin and interconnect are incorporated into the timing graph model of the circuit design. Predetermined delay times are loaded from libraries for corresponding components.

At block 300, a static timing analysis is performed upon the timing graph circuit model. The static timing analysis 300 begins with an initial traversal of the timing graph to mark each clock root, any multi-fan-in or fan-out pins as branch nodes. Inasmuch as a common point of interest between a launch and capture flip flop must be a branching component, the universe of potential common points is thus substantially reduced to remove any non-branching nodes. While flip flops are referred to herein, any sequential logic may be targeted, such as registers, latches, and the like.

Additionally, at sub-block A of Static Timing Analysis block 300, the branch marker nearest each register clock pin of a launch/capture flip flop is identified and back propagated from the data pin thereof. At sub-block B of the static timing analysis, phase propagation is initialized from each clock root. The phase functions as a messenger propagating throughout the circuit design, evaluating tags or markers at each node of the circuit design and propagating forward certain data about the operational timing characteristics and the convergence or divergence of the circuit design therethrough. As each phase propagates forward from the clock root, it picks up branch tags at each branch node marked, as well as, the operational timing characteristics, and these data items are recorded into a CPPR tag. The CPPR tag captures at least the immediate parent nodes of a given node. During propagation, at each branch node encountered, the phase drops the old CPPR tag and generates a new CPPR tag indicating the immediate parent nodes. The phase then generates a hierarchical listing of the ancestor tags according to the previous CPPR tag.

At each multi-fan-in pin, such as for AND, OR, NOR gates, the phases arriving there are merged by performing a worst-case analysis upon the plurality of incoming phases based on such operational timing characteristics as timing delay. Following the analysis, the worst case phase is passed on to the output pin of the multi-fan-in component. The CPPR tags identify a back-traversal to each immediate branch node parent thereof. Additionally, hierarchical tags are organically created for each unique path from the clock root to each corresponding branch node. The hierarchical tags identify ancestor nodes starting with the instantly evaluated node backwards through each parent and branching ancestor thereof. Preferably, the CPPR tags are each stored in a hash table each time a corresponding phase encounters a branch tag.

For example, if a CPPR tag is at node P5 and ancestor nodes P4, P3, P2, P1 exist, the hierarchical/lineage tag corresponding to the CPPR tag lists this reverse traversal path from the instant node P5 back to an originator node P1, arriving at the begin point of the path. Each of the intermediate branching nodes and their nodes P4, P3, and P2 are identified as well, such as by pointer to their memory locations.

At block C of the static timing analysis 300, the CPPR tags are propagated onto the data network (as opposed to the clock network performed in block B of the static timing analysis 300). The phase from a register clock pin is propagated forward to the register output pin. The phase brings the CPPR tag encountered thereon from the clock path into the data network.

The CPPR tags are then evaluated to determine, for any timing arc, if the CPPR tag can be moved back to some earlier CPPR tag ancestor thereof. If yes, the tag is changed, and a new phase is propagated. This evaluation and moving step is repeated until the path terminates, which is usually at the register data pins. This moving of CPPR tags is based on branch tags propagated backwards from downstream register data pins, as performed in FIG. 1b, block 300, subblock A.

At block D of the static timing analysis 300, a CPPR adjustment is calculated wherein the hierarchical tags of branch nodes between launch and capture nodes are compared to determine each of the common branching pins shared by the launch and capture nodes. For example, phases T3 and T2 may have common branch pins between the launch and capture flip flop pair. Conventionally, a rigorous path tracing from the launch and capture CPPR tag pins backwards through each node (including non-branching nodes) had to be painstakingly performed for each launch and capture flip flop pair, as well as for each and every timing path from the clock to each of the respective launch and capture flip flops. Thus, an extremely time-consuming process would be performed numerous times resulting in extended runtime and excessive resource usage. In the disclosed embodiment, the tracing is mitigated, and in some cases even obviated by the more efficient CPPR hierarchical tag traversal and ancestor comparison between launch and capture pair.

Once all of the common pins between launch and capture flip flops are identified, the relevant phases thereon are determined, an adjustment is computed for each common pin, and the minimum adjustment over all common pins is computed. While this still introduces some additional pessimism, it adds the minimum necessary to accommodate the ever-increasing clock path divergence and reconvergence complexity along with the shrinking technology nodes and transistor sizes.

At block 400, a timing report is generated for the circuit design indicating arrival times, delay times, slack times, and other operational timing characteristics of the circuit design. This timing report 400 is passed on to a physical placement and routing optimizer (block 500) to transformatively correct timing violations determined therein.

Figure 3:
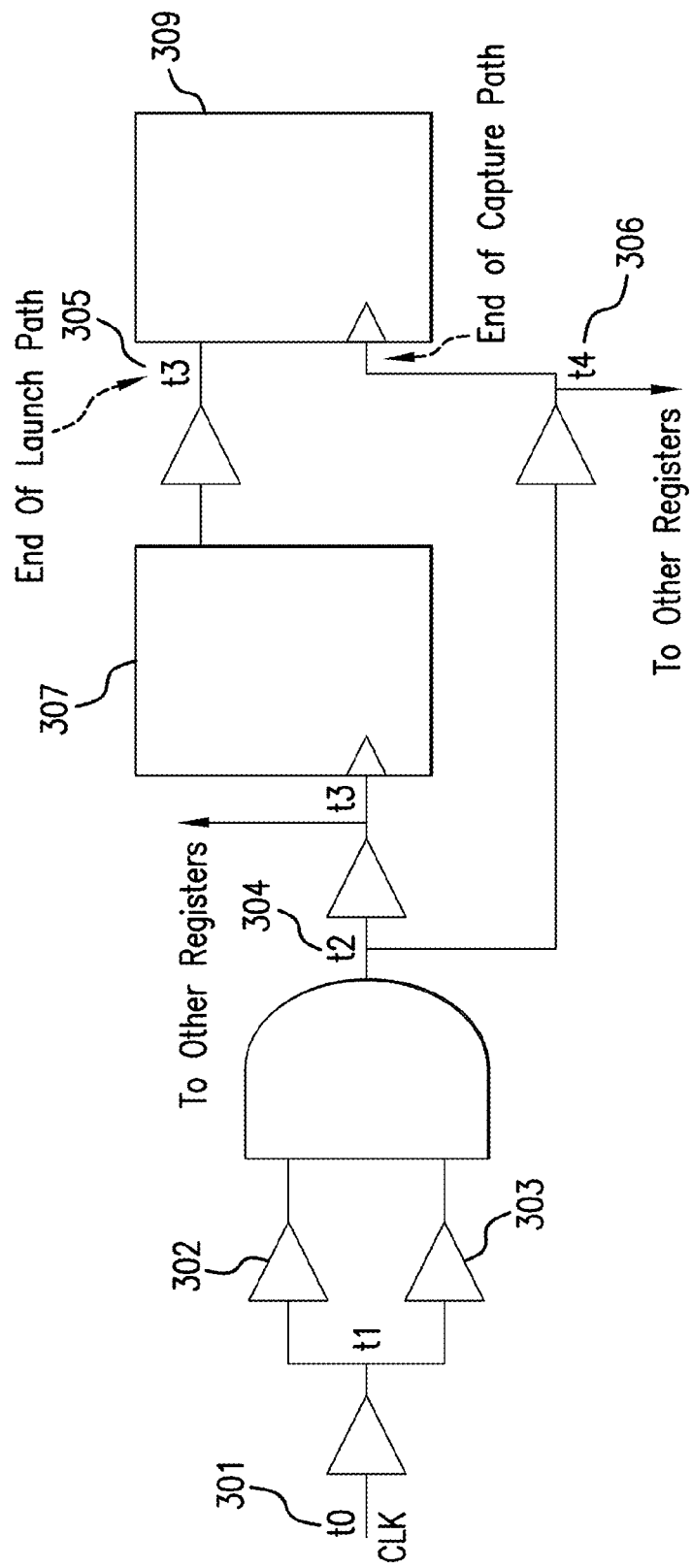
FIG. 3 is an exemplary conventional flow for common path pessimism removal (CPPR) illustrating a truncated worst-casing analysis which propagates only one new phase at each multi-fan-in gate resulting in deficient pessimism removal especially in complex clock networks and designs of decreasing feature sizes.

As seen in FIG. 3, a conventional approach for common path pessimism removal (CPPR) is illustratively shown. At block 301, a clock root is shown. The clock root is the begin-point having an input clock oscillator signal which will ultimately pass through the circuit design synchronizing actions amongst a plurality of elements including, in this example, a launch and capture flip flop pair seen as block 307 and block 309. The clock signal propagates from clock root 301 through each of buffers 302 and 303 as multiple fan-ins of an AND gate.

At stage 304, only one of the two clock signals and its attendant operational timing characteristics propagate forward in the fan-out cone of the AND gate due to the worst casing thereof. Conventionally, the worst casing analysis was performed to determine the greatest delay amongst fan in segment 302 and fan in segment 303 with the corresponding segments or interconnects through the AND gate. Thus, at stage 304, any paths and operational timing characteristics other than the worst case path and delay were discarded and only one of the timing signals propagated on.

At each branch point in the clock network of the circuit design, a new phase is propagated. Thus, while a clock phase with tag T0 coming from the clock root 301 would pick up tag T1 (and discard tag T0) and initiate a new phase propagating onto buffer segment 302 and buffer segment 303, with two phases arriving at the fan-out pin 304, the worst phase would be thrown away and a new phase with tag T2 at stage 304 would propagate forward. Due to a succeeding branch point, a phase T3 would pass on to flip flop 307 clock pin, and another phase T4 would pass on to flip flop 309. The T3 phase reached the clock pin of the register or flip flop 307 and the same phase propagates on launch path 305 in the data network to the capturing flip flop 309. Thus, the capture flip flop 309 would see two phases: T3 arriving on the data pin and T4 arriving on the clock pin.

To remove the pessimism unduly added irrespective of the common path shared, a tracing to determine a common pin between launch flip flop 307 and capture flip flop 309 would be performed backwards, upstream through the circuit design. Thus, a tracing would start at the clock pin of register 309 and traverse backwards through the segment 306 having phase T4 to arrive at a phase T2 304. Additionally, the launch flip flop 307 would be back traced from phase T3 to phase T2 304 where it would be determined that the phase T2 304 is common between launch flip flop 307 and capture flip flop 309. Such result is less than ideal as only the worst and best arrival times are used at this pin to determine the CPPR adjustment. This may be too optimistic for complex, re-convergent clock networks and may result in IC product failure in the field.

Due to the disposal of the additional phases and their attendant operational/structural timing characteristics at the AND fan-out pin 304, no additional parent information is available and thus, analysis stops at phase T2, fan-out 304. Thereby, the runtime is constrained; however, the pessimism removal is far less than ideal giving less than realistic results.

Such scheme for computing CPPR required the CPPR computing adjustment to be taken only across the worst and best clock paths for a launch/capture flop pair. However, with the shrinking technology node or transistor length such as, for example, below 40 nanometers, 28 nanometers, and the like, the mere best and worst case paths do not provide a realistic assessment of the delay. A highly divergent and re-convergent clock network also exacerbates this problem, resulting in a less than accurate timing database to be passed on to the optimizer. While undue additional pessimism may be added, the result is just the highly repetitive engineering change order (ECO) fixing loops. On the other hand, any undue optimism accidentally introduced into the circuit design timing data could prove catastrophic for the finished IC product.

Figure 4:
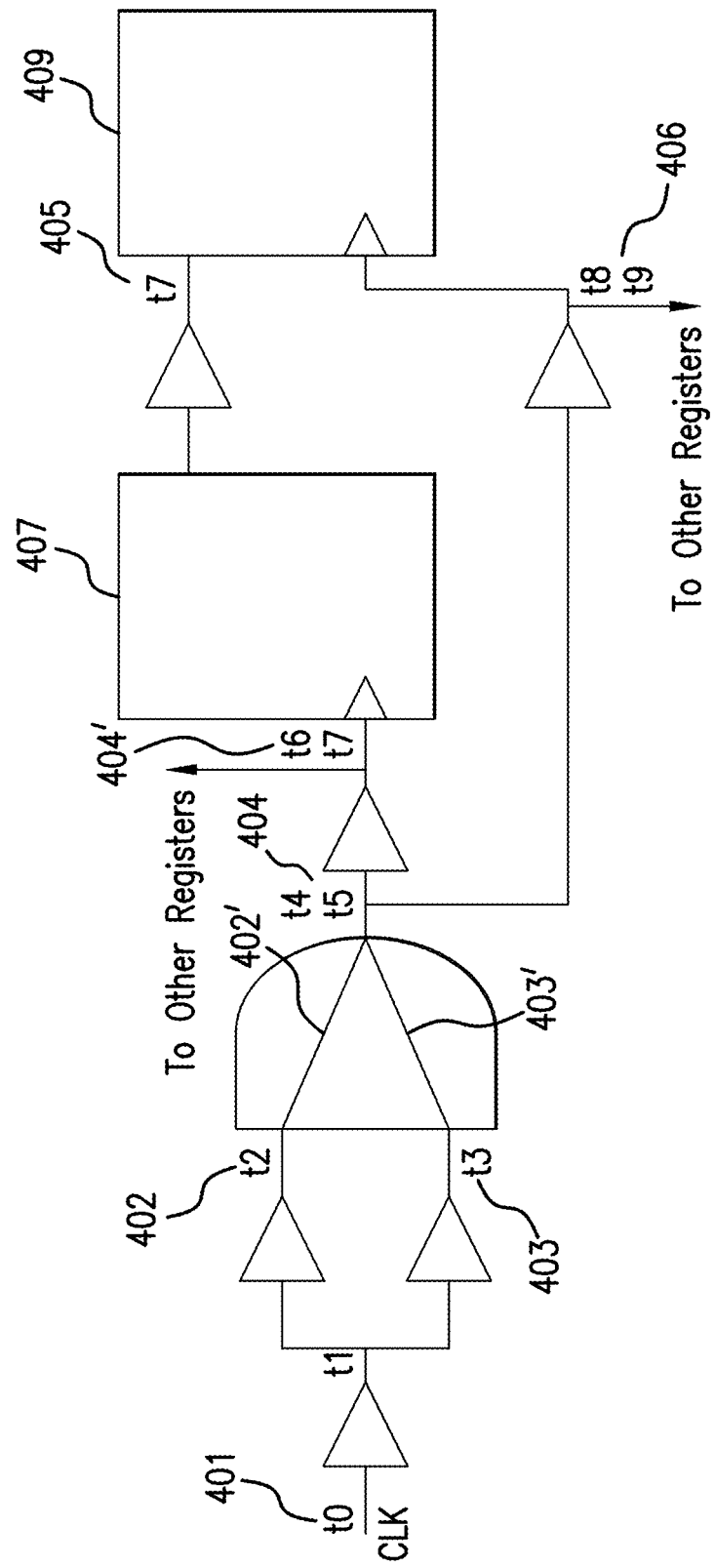
FIG. 4 is another illustrative flow diagram example of a conventional CPPR approach which results in an exponential explosion of timing phases and prohibitive memory burden along with untenable runtimes and requiring the tracing of each and every path from each launch and capture flip flop to each clock root.

In light of these shortcomings and potential pitfalls, FIG. 4 illustrates another conventional approach employed to propagate a phase from T0 401 (the clock root) which would carry the T1 phase information as well as other operational timing characteristics of the circuit. At each multi-fanin input, the phase would pick up a branch tag to replace the branch tag it was carrying: tag T2 along segment 402 and tag T3 at segment 403. The phase coming from segment 402 passes through a path 402' through the AND gate to arrive at the multi-fan-out pin 404 where two additional tags T4 and T5 have been created due to the two incoming phases. If there were three incoming phases, there would be three of the conventional CPPR tags created. In this approach, each path is evaluated and propagated rather than merely the worst case as in other conventional CPPR measures.

All relevant phases, including the non-worst case phases, propagate through the multi-fan-in pin for the AND gate. Thus, the phase from segment 402 picks up a tag T4 and passes on to another branch point where another tag T6 is picked up at 404' replacing T4. Similarly, a phase from segment 403 picks up tag T5 and then picks up tag T7 replacing T5. Ultimately, both tags T6 and T7 arrive at the clock pin of the launch flip flop 407. Only the phase with the worst arrival time is propagated across from register clock pin CLK to data pin Q. Assuming in this example, the phase with tag T7 is worse than tag T6, then the phase with tag T7 is propagated on to the Q pin. As explained above, both conventional CPPR tags T6 and T7 will share the same branch tag. The phase having tag T7 is passed on through the launch pin into the data network where no additional CPPR tags are added and the phase with tag T7 from segment 405 is passed on to the data-in capture pin D of capture flip flop 409. Additionally, the phase with tag T4 at 404 traverses through a lower segment to arrive at another branch point where a T8 tag is picked up by the phase at branch 406. Similarly, the phase with tag T5 at 404 traverses through the lower segment to arrive at the branch point where a tag T9 is picked up by the phase at branch 406.

The phase propagates on to the clock pin of the capture flip flop 409. Then, to determine common pin, inasmuch as phase at data pin of 409 carries tag T7, path tracing is commenced from that branch tag T7. However, when pin with tag T7 is reached, all phases with the same matching branch tag and clock information are collected. Therefore, two phases for launch path are obtained, one with tag T6, one with tag T7. Similarly, phases with tags T8 and T9 on the clock pin of segment 409 are collected. Inasmuch as each phase represents one path, there are seen to be two paths for launch and two paths for capture. A painstaking tracing backwards through each of the components to arrive at a common pin would then be performed for each node of each of the possible paths for each of the flip flops. Even in this highly simplified example, a total of four paths for the launch capture pair require tracing which will require substantial processing and memory resources.

A common pin remains to be computed for each launch-capture path pair. Firstly, launch path noted by T6 is traced by traversing node to node through the netlist from pin associated with tag T6, back to pin with tag T4, to pin with T2, to pin with T1. Next, a capture path is traced by progressing from the pin with T8 to pin with T4. Given that the pin with T4 was visited/traced during launch path tracing, the common pin is found, which refers to the pin with tag T4. Matching phases are found on this pin for launch and capture and CPPR is computed on this pin for this path. Next, for the same launch path, another capture path is traced from T9 to T5. Inasmuch as T5 shares the same branch tag as T4, the common pin is found for this path pair as T4. Once again, matching phases are found on this pin which share tags T4 and T5, and CPPR is then computed.

The above steps are then repeated for the other launch path and the two capture paths. In this example, each path pair leads to the same common pin BUT 4 path traces still need to be performed to identify the common pin for each path pair. In any other example, the common pin for path pairs could have been different. Also, even though the common pin is the same for all four path pair combinations, matching relevant phases on the common pin had to be found each time to compute CPPR adjustment. The matching phases may have been the same for the paths or different.

Thus, an exponential explosion of phases created to pass through the circuit at each and every multiple fan-in, fan-out, and branch point is encountered. Such exponential increase in phases results in extreme memory requirements both in short-term, temporary storage, and in the long-term results storage. Additionally, runtime and processing resources for such CPPR remediation is excessive, owing to the node-by-node tracing of each and every possible path between clock root and launch and capture flip flops. Such runtime and memory requirements are sufficiently onerous in larger and more complex designs to be prohibitive to the extent that the circuit design could not be properly adjusted or made more realistic through the removal of the pessimism in the CPPR process.

Figure 5:
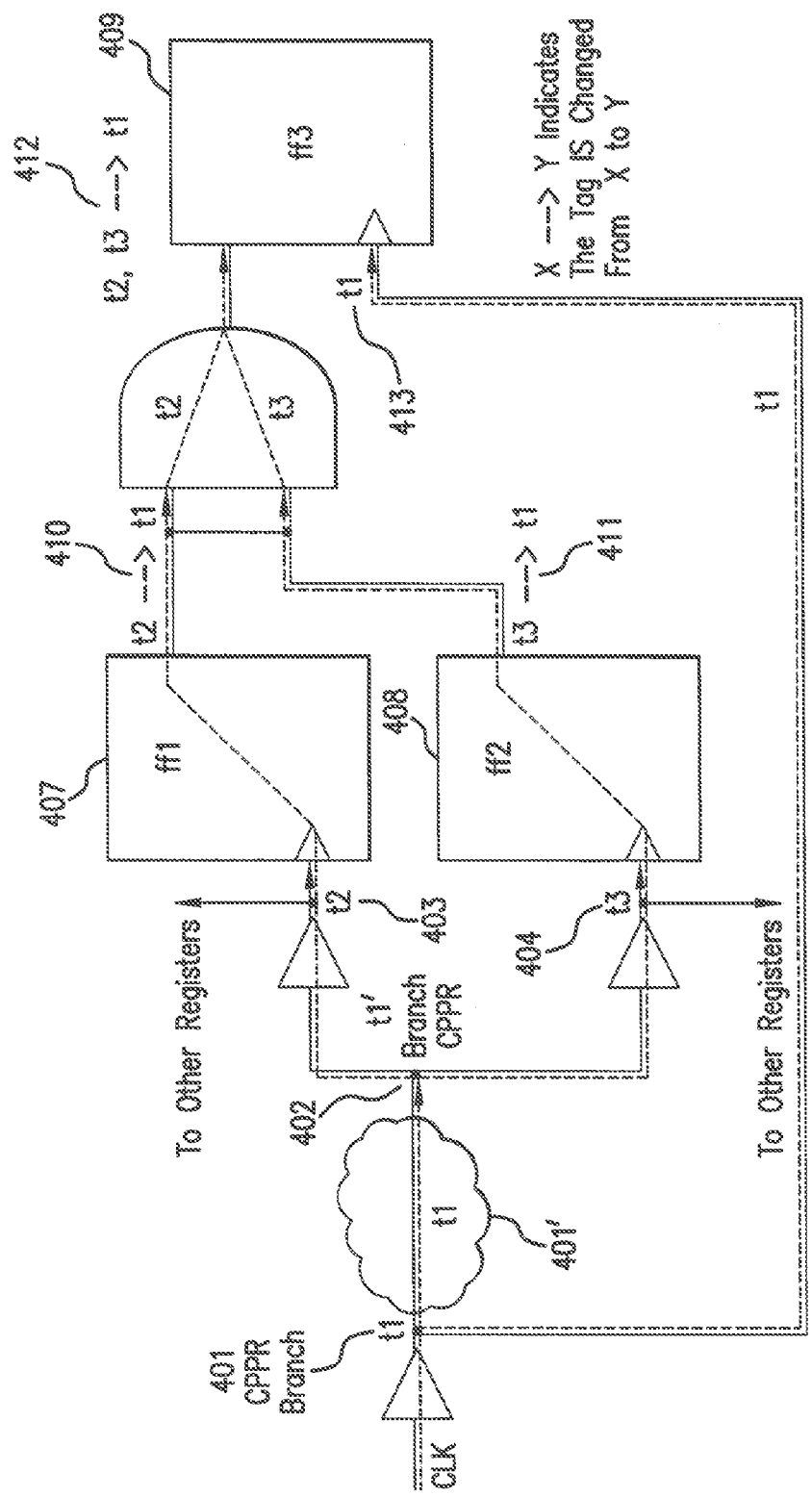
FIG. 5 is a flow diagram illustrating a conventional CPPR approach.

As seen in FIG. 5, a clock root comes from the upstream or leftmost part of the exemplary circuit portion. At branch T1 401, an incoming phase from the clock signal root or left hand side picks up the tag T1 and traverses on through a network 401' of non-branching logic. The logic in 401' is inconsequential as no convergence or divergence exists therein, and thus, a potentially large amount of logic which would ordinarily be painstakingly back-traced node by node may be avoided (just through the logic portion 401').

At branch 402, one phase picks up tag T1', splits off and goes along a path to launch flip flop FF1 407 picking up a tag T2 to replace T1', while another phase picks up tag T1', propagates from branch point 402 to branch 404, picking up a tag T3 to replace T1' in the process along the way to launch flip flop 2 FF2 408. The phase carrying tag T2 propagates through the flip flop 1 FF1 407 onto the data network through the launch pin of flip flop 1 FF1 407 where the phase with tag T2 traverses a segment 410 to a multi-fan-in AND device which then propagates across the AND device to a capture device 409. The phase with tag T3 enters the clock pin of flip flop 2 FF2 408, propagates thereacross, across another segment to a multi-fan-in of the AND gate, and propagates on to the capture flip flop 3 FF3 409. Thus, both phases containing tags T2 and T3 propagate on the capture flip flop 3 FF3 409. Additionally, the phase carrying tag T1 that does not progress through the logic cloud 401' proceeds along any suitable number of segments to arrive at pin 413 of flip flop 3 409. Thus, in the conventional approach, three phases-in this highly simplified example T1, T2, and T3—arrive at flip flop 3 409 which results in memory penalty due to the maintenance of each of the phases thereof. Moreover, the runtime will be affected as the phases of T2, T3, and T1 must be back-traced node-by-node to arrive at a common pin for each of the launch and capture flip flop pairs. Worse yet, as each of phases carrying tags T2 and T3 at the multi-fan-in AND gate are different phases (T2 does not equal T3), no worst-casing is performed and both phases carrying T2 and T3 propagate on. In the aggregate, such maintenance of multiple phases and tags is substantial.

The tags (for example T1) that are carried by the clock pins of all the end points of a data network pin are identified and the data network tag is moved back—left or upstream—to some earlier tag such that the chosen tag is either the common parent of the launch path flop and some capture flop the data net is reaching, or some multi-fan-in pin on the launch clock path, whichever is sooner. This ensures that for all launch and capture pairs involving that launch flop, correct CPPR can be computed for each capture flop.

Assuming that the cloud 401' contains only single input buffers and/or inverters, each of tags T2 and T3, 403 and 404 respectively, may be moved back to tag T1 401 as the launch flops are only connected to the flop with tag T1. To implement this moving back, the tag at, for example, the output pin Q of flip flop 407 is modified to indicate T1 rather than T2. Similarly, the tag at output pin Q of flip flop 408 is modified to indicate T1 as well, rather than T3. Due to this, the tags in the data network can instead be set uniformly as CPPR tag T1 which allows the phases to be merged by worst-casing at the output of the multi-fan-in AND gate. Thus, where two phases carrying tags T2 and T3 would otherwise propagate on at stage 412, only one phase carrying tag T1 is propagated on. This is due to the fact that the phase carrying tag T2 at 410 could be moved back to tag T1 as a common ancestor with the phase carrying tag T3 also moved to T1 as an ancestor at 411. Now, at stage 412, one phase with tag T1 arrives at capture flip flop 3 (FF3) 409 on the data pin, and an identical phase T1 arrives at the clock pin 413 of the flip flop 3 (FF3) 409. Thus, a common pin T1 401 is established as a common ancestor for all of flip flops 1 407, flip flop 2 408, and flip flop 3 409.

In order to identify all possible launch and capture phases, additional tags had to be added, as discussed above. Each new unique tag resulted in a new unique phase and after just a few stages of re-convergence in the clock network, the number of phases propagating through a pin increased significantly. It was not uncommon for the number of phases in clock network pins to reach into the hundreds in real-world designs. A flop pair in such a design would require propagating hundreds of phases on both launch and capture paths and then computing CPPR adjustment for the hundred squared possible paths with path tracing. Using the traditional approach, such computation results in runtime degradation that is prohibitive in many cases. In order to overcome such prohibitive runtime issues, the traditional approach would discard all incoming phases when they reach a certain threshold, such as one hundred. A new phase would be created with none of the ancestral or timing history—but instead would use the worst-case of all of the discarded phases. Although this mitigated the runtime issue, it introduced two other issues. As the new tags had no previous parent history, it was then not possible to move the tags back on the data network if they happened to be connected to some flop that had its clock path information removed. This resulted in increased number of phases in the data network and hence increased memory requirements. Additionally, the phase propagated carried the worst-case timing information and thus, only that phase could be traced during path tracing. For these cases the CPPR was computed based on the old scheme of using CPPR for best and worst clock paths. The runtime degradation was controlled at the expense of memory overhead and inaccuracy in CPPR reported on some paths.

Figure 6:
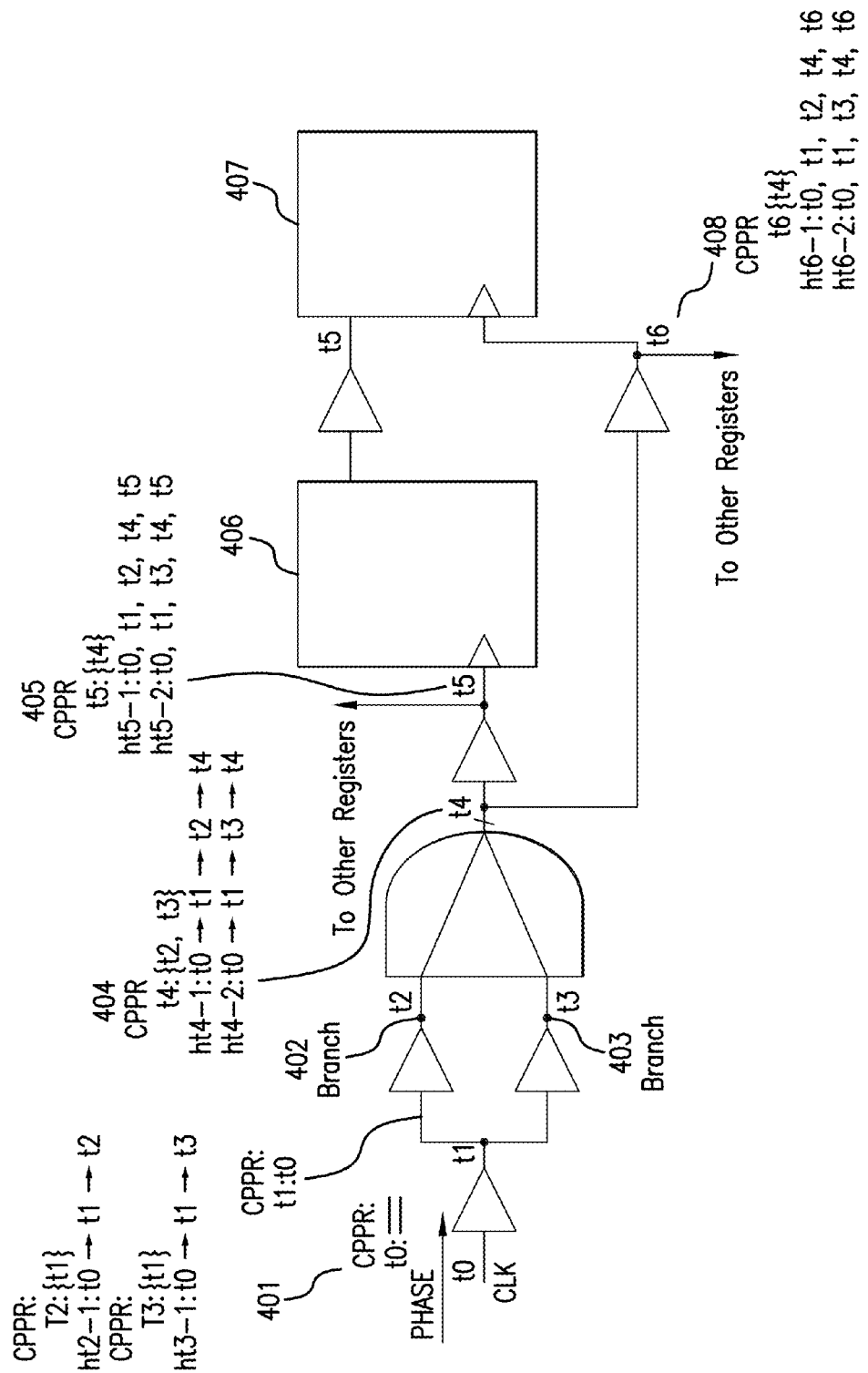
FIG. 6 is an exemplary flow diagram illustrating several aspects of an improved CPPR procedure in accordance with an exemplary embodiment of the present invention.

As seen in FIG. 6 an exemplary embodiment is shown including a CPPR preprocessing step which traverses through the circuit design placing branch markers T0, T1, T2, T3, T4, T5, and T6, at each clock root and branch point therein. Phases are then propagated in the circuit design to establish a plurality of extended, intelligent CPPR branch tags or hierarchical/lineage tags in accordance with an exemplary embodiment. An incoming phase encounters a branch tag T0 established in the pre-processing stage (discussed above) at the clock root (leftmost portion of the exemplary circuit design portion). The phase acquires the tag information, such as the branch identity, structural, and operational timing characteristics, and the like, and stores the acquired information into a CPPR tag of the phase. The phase passes on to a succeeding branch point bearing tag T1, where one phase propagates to a segment 402 picking up a tag T2 indicating a multiple fan-in AND gate. Additionally, another phase propagates from the branch point with CPPR tag T1 and picks up a T3 tag indicating another branch of the multi-fan-in node for the AND gate. Each of the extended CPPR tags/lineage tags includes, amongst other information, a set of immediate parent branching nodes for each unique path from the clock root to the instantly evaluated node. In other words, each extended CPPR tag for each branching point includes an identification of each of its immediate ancestor or parent branching nodes along a path stretching back to the clock root. Thus, the CPPR tag for T2 includes an indication of T1 as a prior branching parent. The CPPR tag for T3 likewise includes an indication of the parent T1. If T3 or T2 had additional parent branching points, they would be enumerated as well.

The extended CPPR tags have been established to provide for the recordation of a single parent branching node or a plurality thereof such that one extended CPPR tag may replace a plurality of conventional CPPR tags. Such plural recordation of branching parent nodes in a single extended CPPR tag is particularly beneficial at stage 404 where phases carrying tags T2 and T3 have been merged into a single phase and single corresponding extended CPPR tag bearing the ancestral branch history of each phase rather than separate phases and separate tags. Thus, at the branch point bearing tag T4, one extended CPPR tag is created where the immediate branching nodes of T4 include T2 and T3 for the two alternate phase-traversed paths: branch 402 and branch 403.

A hierarchical/lineage tag HT4_1 includes a unique path from branching node to branching node describing the entire path (of branching nodes) from a clock root to the ultimate node or phase containing the last CPPR tag. Thus, the hierarchical tag HT4_1 indicates a path from T0 to T1 to T2 to T4. Additionally, the second hierarchical tag HT4_2 includes the path from T0 to T1 to T3 along the 403 branch to T4. Rather than propagating two separate phases from the fan-out of the AND gate, one for each path, a single phase is passed on. However, in the past where a single phase was passed on due to a worst-casing analysis of the multiple fan-in signals, and consequentially all the information in the non-worst case phases was discarded, the instant CPPR tag at stage 404 retains the structural and timing information of the multiple paths entering the multiple fan-in AND gate. Thus, no path information is lost and a common parent node may be sought as far back as possible without node-by-node tracing of the extensive netlist data. The phase will propagate on to arrive at the next branch point where a new tag T5 will be picked up by the phase which will, in turn, propagate through the launch flip flop 406, enter the data network and pass on to capture flip flop 407 data pin.

The CPPR tag for T5 illustratively includes an identification (such as by name, location, or an actual pointer or shortcut thereto) of its immediate branching parent node T4 as well as two hierarchical tags: HT5_1 indicating the path traversal through branching nodes T0, T1, T2, T4, and T5, as well as a second hierarchical tag HT5_2 indicating the separate unique path of T0 to T1 to T3 to T4 to T5. Thus, a phase with tag T5 enters the data pin of the capture flip flop 407, whereas a phase carrying tag T6 arrives at the clock signal pin of flip flop 407. The CPPR tag information at branch T6 408 includes an identification of the immediate parent node of T4 and two hierarchical tags for each unique path from T6 stretching back to the clock root 401.

The hierarchical tag HT6_1 includes the path from T0 to T1 to T2 to T4 to T6. Likewise, the second hierarchical tag HT6_2 includes the alternate path T0 to T1 to T3 to T4 to T6. In such manner, the CPPR tags for T5 and T6 (405 and 408 respectively) may be evaluated to determine the common branching nodes therebetween by employing, for example, string subtraction (removing any non common branch ancestor) based on a unique identifier (UID) name and parsing. Alternatively, if the hierarchical tag is a one dimensional array or vector of discrete values, a direct value comparison looping may be performed. In a preferred embodiment, the ancestral nodes are represented as pointers to class data objects, the memory location pointed to for each ancestor in each hierarchical tag may be compared to determine identity therebetween such as by use of predefined object oriented programming (OOP) class methods established to compare such classes and data fields thereof. If the CPPR tags are represented by structs, similar measures for determining identical fields or elements in fields may be employed. Indeed, any suitable method for comparing the hierarchical/lineage tags to determine common ancestral members may be employed.

Thus, for tags T5 and T6 (405 and 408 respectively), the launch and capture flip flops 406 and 407 respectively share ancestor tags T4, T1 and T0. Further, the traversal and operations upon the simplified lightweight CPPR tag space involving a tree of potential paths provides substantial savings as opposed to tracing each end point to each begin point node-by-node for each path for each register in the circuit design through the extensive netlist data. Runtime is thereby substantially reduced to allow for a wider universe of more complicated circuit designs to take advantage of CPPR. Also, a substantial reduction in the number of phases traversing through potentially hundreds of millions of gates or more in some cases may be realized via merging into extended CPPR tags—substantially reducing memory requirements in both short term and long term and yielding more realistic values for the pessimism removal in the timing database to guide the optimizer in its corrective transformations of the circuit design.

The set of hierarchical tags are preferably stored in a separate global hash table which may be retrieved relatively quickly through hashing, such as by MD5sums, secure hashing algorithms SHA1, SHA2, or the like, of a given tag. Any suitable hashing measures may be employed.

Once common pins are identified, appropriate matching phases on the identified common pins are determined and used to compute CPPR adjustment for each path pair. In the past, due to the exponential explosion of phases, upon reaching a certain number of phases above a threshold level while propagating through a circuit design, known approaches discarded all of the phases and started over again periodically. Consequently, CPPR calculations inherently could not be as effective as large portions of the data were discarded. Such discarding of phase data, path topology/structure, and operational timing characteristics is obviated herein, resulting in a much more efficient and effective CPPR reduction for the removal of pessimism.

Figure 8:
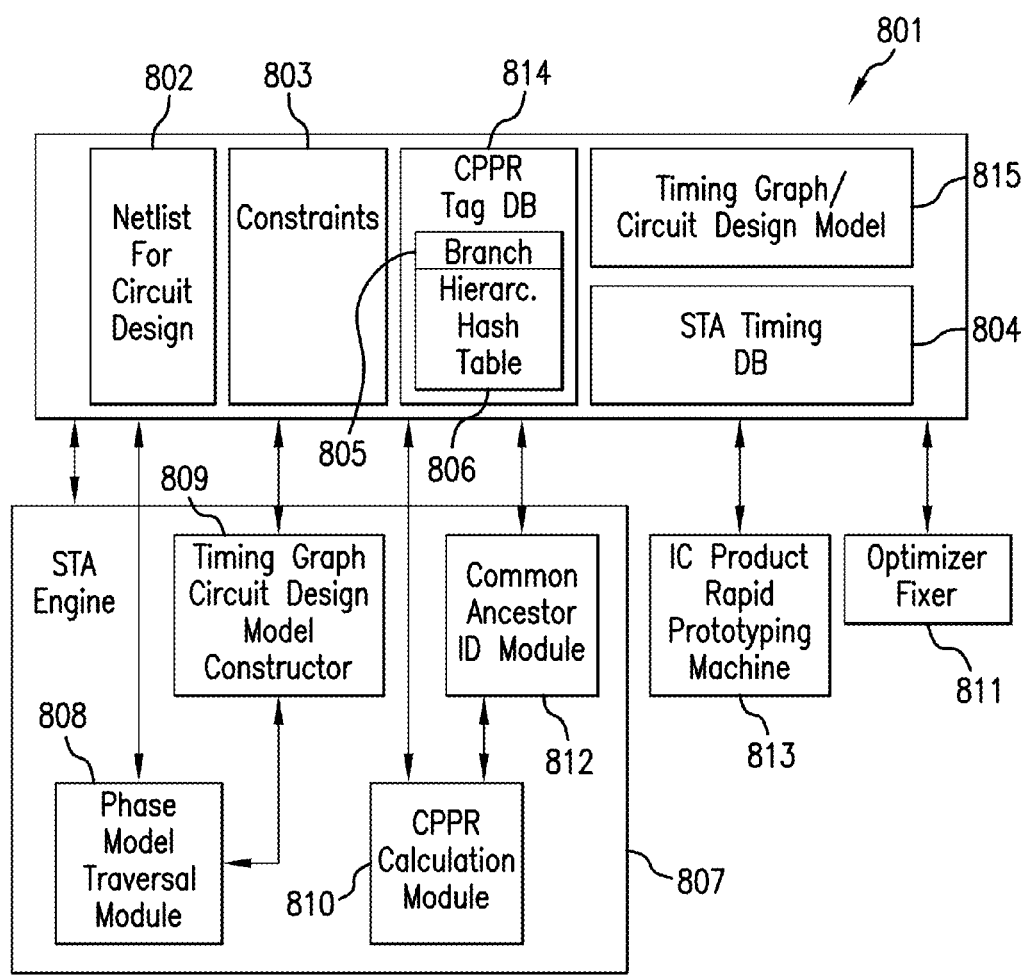

As seen in FIG. 8, a storage module 801 contains a plurality of databases, data stores, or data items. The storage module 801 may store netlist data defining the circuit design 802, predefined structural or operational constraints 803, CPPR tag database 814, branch table 805, hierarchical hash table 806, an STA timing database 804, and a timing graph 815.

STA engine 807 functions as described above in regard to FIG. 2 in accessing at least the netlist 802 and constraints 803 to trigger the timing graph constructor 809 to build a timing graph 815 of the circuit design and perform a delay calculation therethrough. Phase model traversal module 808 traverses the timing graph 815 establishing tags which may preferably be stored in the Branch tag database (DB) 805 of CPPR tag DB 814. Traversal module 808 establishes phases to propagate through the circuit design. Common ancestor ID module 812 identifies common ancestor pins, nodes, tags, or phases throughout the Hierarchical Hash Table 806 of CPPR Tag DB 814. CPPR calculation module calculates CPPR adjustments on each of the identified common ancestors to reduce pessimism in the STA timing DB 804. Optimizer module 811 receives the STA timing DB and transformatively modifies the circuit design 802 such as by the insertion, deletion, or resizing of gates defining the circuit design according to extant timing violations resulting from pessimism in the STA Timing DB 804. IC product prototyping machine/(s) 813 produce a prototype physical IC product embodying the corrected circuit design such as by combinations of optical lithography, etching, carbon vapor deposition (CVD), additive 3d printing, or the like, though any suitable measures for fabricating an IC product embodying the transformed circuit design may be employed. Additionally, a picker/placer may be employed to package the circuit design.

Figure 7:
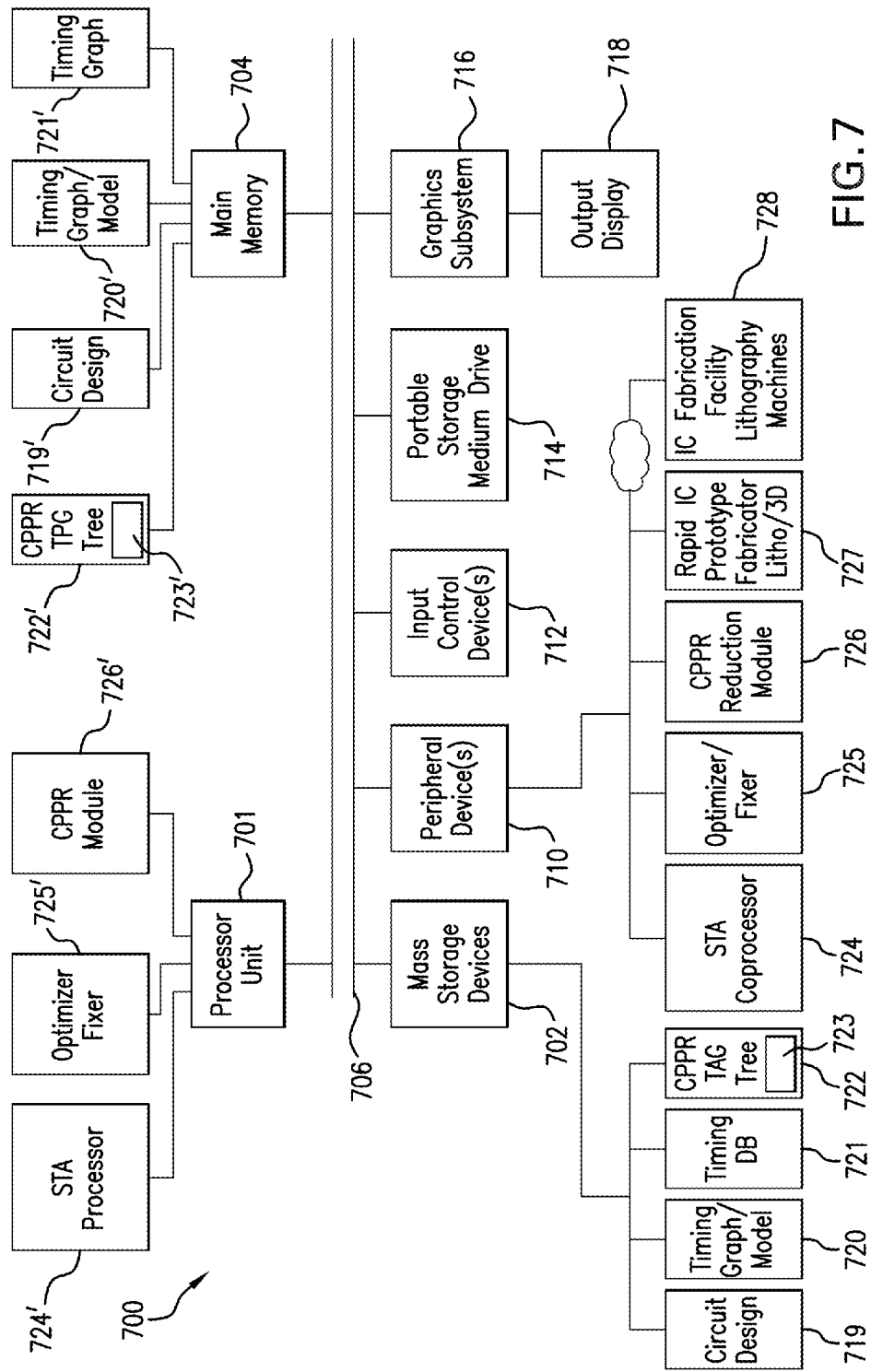
FIG. 7 is a block diagram illustrating an exemplary interconnection of components in a processor-based system for implementing an exemplary embodiment of the present invention; and, FIG. 8 is a block diagram illustrating an exemplary interconnection of components in a system for implementing an exemplary embodiment of the present invention.

Turning to FIG. 7, an exemplary block diagram of a computer system for hosting and/or executing an exemplary configuration of the disclosed system and method respectively is illustrated. A computer system 700 contains a processor unit 701, a main or primary memory 704, an interconnect bus 706, a mass storage device 702, peripheral device(s) 710, input control device(s) 712, portable storage drive(s) 714, a graphics subsystem 716, and an output display 718, amongst other components (components may be used herein at varying levels such as a gate component or a black-box type component such as, for example, the main memory component). System 700 may be incorporated into a system on chip (SOC), such as the exemplary circuit design seen in FIG. 1D. Processor unit 701 may include a single microprocessor or a plurality of microprocessors for configuring computer system 700 as a multi-processor system, additionally, each physical processor unit 701 may include a plurality of cores. Main memory 704 stores, in part, instructions and data to be executed by processor 701 along with circuit design data including circuit design, operational timing data, topology data, and structural data, amongst other relevant data. Main memory 704 preferably includes banks of dynamic random access memory (DRAM) as well as high-speed cache memory, such as static random access memory (SRAM) at various levels of the system architecture.

For the purpose of simplicity, the components of computer system 700 are shown connected via interconnect bus 706. However, computer system 700 may be connected through one or more data transport means. Mass storage device 702', which may be implemented with a magnetic disk drive, an optical disk drive, a solid state device such as a flash device, an attachment to network storage, cloud storage, a RAID arraying any of the above, and the like, is preferably a non-volatile storage device for storing data, databases, and instructions, to be used by processor unit 701. In certain configurations, mass storage device 702 may store portions of the software to load it into main memory 704 or into a firmware or rom. Mass storage device 702 is preferably employed to store and provide access to circuit design data 719, timing graph 720, timing database 721, and a CPPR tag tree 722 including an hierarchical tag hash table 723. Such databases, data stores, tables, and physical implementation circuit design data and the like are preferably retrieved from mass storage device 702 and stored in main memory 704 to provide faster reading and writing access thereto; therefore, circuit design 719', timing graph 720', timing database 721', and a CPPR tag tree 722' including an hierarchical tag hash table 723' are shown corresponding to their respective data items in mass storage device 702. Periodic synchronizing measures will be taken between the volatile main memory 704 and non-volatile mass storage devices 702 to ensure data archival.

Portable storage medium drive 714 operates in conjunction with a portable non-volatile storage medium such as a floppy disk, a compact disk read only memory (CD-ROM), or a digital versatile/video disk read only memory (DVD-ROM), to input and output data and code to and from the computer system 700. In one configuration, software portions, circuit design data, and the like are stored on such a portable medium, and are input to computer system 700 via portable storage medium drive 714.

Peripheral device(s) 710 may include any type of computer support/extension device such as an input/output (I/O) interface, such as, for example PCI express or gigabit ethernet, though any suitable IO, backplane, or other suitable interface may be employed to add additional functionality to computer system 700. For example, peripheral device(s) 710 may include additional network interface cards to interface computer system 700 to additional networks, servers, clusters, farms, or facilities, such as a separate semiconductor fabrication plant. Peripheral devices may include further specialized processors such as clustered video cards utilizing graphics processor unit (GPU) floating point processing logic to supplement or supplant CPU processing. Dynamically configurable logic such as, for example, field programmable gate arrays (FPGAs) may also be coupled to system 700 through peripheral device(s) block 710. Still further, specialized application specific integrated circuits (ASICS) may be coupled thereto to implement specialized logic to accelerate or implement certain portions of the invention such as a timing analysis module, a data reduction module, and a correction module including an physical implementation optimizer engine. Such modules may be given direct memory access (DMA) and may have their own memory integrated therein. Additionally, a rapid circuit prototype fabrication unit 727 may be coupled to the system via a backplane, system IO port, network connection, or the like. Such fabrication unit 727 may include, for example, a lithographic or 3d additive printer, operable to physically fabricate a circuit design defined by physical implementation data. A physical placement and routing optimizer 725, STA coprocessor or FPGA device 724, CPPR module 726, and via perhaps a network connection, an IC fabrication facility 728 with one or a plurality of fabrication devices are preferably coupled to system 700 via peripheral devices 710 though any suitable connection may be employed. STA processor/(s) 724', Optimizer/fixer 725', and CPPR module 726' may also be integrated with processor unit 701.

Input control device(s) 712 provide a portion of the user interface for a computer system 700 user. Input control device(s) 712 may include an alphanumeric keypad for inputting alphanumeric and other key information; and a cursor control device such as a mouse, a track pad or stylus; or cursor direction keys.

In order to display textual and graphical information, computer system 700 contains graphic subsystem 716 and output display(s) 718. Output display 718 may include a cathode ray tube (CRT) display, liquid crystal display (LCD), active matrix organic light emitting diode (AMOLED), plasma display, projector, or the like. Graphic subsystem 716 receives textual and graphical information and processes the information for output to display 718.

In a software implementation, portions of the software for certain measures may include a plurality of computer executable instructions, to be implemented on a computer system such as system 700. Prior to loading in the computer system 700 or firmware, the software may reside as encoded information on a computer-readable tangible medium such as a magnetic floppy disk, a magnetic tape, CD-ROM, DVD-ROM, flash memory, network attached storage (NAS), or any other suitable computer readable medium. Such software may control multiplexors, selectors, field programmable gate arrays (FPGAs), ASICS, or the like to implement logical control of certain features herein, such as, for example, timing analysis, path propagation, back-tracing, tree-forming, data reduction, and/or physical implementation optimization features.

In an illustrative implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Although this invention has been described in connection with specific forms and configurations thereof, it will be appreciated that various modifications other than those discussed above may be resorted to without departing from either the spirit or scope of the invention. For example, equivalent elements may be substituted for those specifically shown and described, certain features may be used independently of other features, and in certain cases, particular combinations of circuit design and implementation flow of processing steps may be reversed, interposed, or mutated, all without departing from the spirit or scope of the invention as defined in the appended claims.

What is claimed is:

1. A method for pessimism minimization in timing delay analysis for a pair of devices clocked according to a common clock root in a circuit design, the method comprising:

generating a timing model for a circuit design having a clock root and a plurality of clocked devices respectively coupled thereto by a plurality of interconnection points and at least one intermediate circuit component, at least a first and second of said clocked devices being paired in actuation for launch and capture of a data signal therebetween, a first path being defined between said clock root and said first clocked device and a second path being defined between said clock root and said second clocked device;

generating a lineage tag for at least one interconnection point determined to be a branching point, a branching point being defined by an interconnection point having a plurality of incoming or outgoing path segments, at least one of said lineage tags indicating a history of intervening branching points traversed by said first or second paths between said clock root and a corresponding branching point;

determining at least one common path segment shared between said first and second paths based upon a comparison of at least one lineage tag from each of said first and second paths; and, using a processor to selectively set for an interconnection point of at least one of said first and second clocked devices a timing delay parameter compensated for said common path segments shared between said first and second paths, said timing delay parameter indicating a signal propagation delay, whereby common path delay pessimism is avoided for said paired clocked devices.

2. The method as recited in claim 1, wherein said selective setting of said timing delay parameter within each of said first and second paths removes any timing disparity attributable to said common path segment.

3. The method as recited in claim 1, wherein at least one of said lineage tags includes identification of at least one branching point disposed within the first or second path and at least one branching point outside the first or second paths.

4. The method as recited in claim 1, wherein at least one of said lineage tags includes identification of all intervening branching points disposed between the corresponding branching point indicated by said at least one lineage tag and said clock root on at least one of said first or second paths.

5. The method as recited in claim 1, wherein said timing delay parameter is selectively set for interconnections of said first and second clocked devices with a delay differential between said first and second paths exclusive of delay contributed by common path portions, said delay differential indicating timing violations and guiding remedial physical transformations of the circuit design.

6. The method as recited in claim 1, further comprising selectively associating at least one lineage tag with an interconnection point for each of said first and said second clocked devices according to a set of predetermined parameters including proximity along said first or second path to said first or second clocked device.

7. The method as recited in claim 1, wherein a phase data object is propagated along path segments of said timing model from said clock root, said phase data object acquiring a corresponding history indication from each lineage tag encountered during propagation, at least one new phase data object being generated and propagated forward at each branching point having a plurality of outgoing path segments; and, lineage tags being combined at each branching point having a plurality of incoming path segments where phase data objects converge.

8. A method for common path pessimism minimization of timing delay parametric data for a memory device pair of a circuit design, the method comprising:
   establishing at least one processor coupled to a memory, said memory storing circuit design data for a circuit defined by a plurality of circuit components including at least one clock root, at least one memory device pair, and at least one branching point, said circuit components being coupled together by a plurality of interconnecting path segments therebetween, said branching point defined by an interconnection point having a plurality of incoming or outgoing path segments;
   executing the processor to generate a timing model based on the circuit design data, said timing model including at least one acquired timing delay differential parameter for a predetermined set of circuit components of the circuit design including at least said memory device pair, said timing delay differential parameter indicating a signal propagation delay difference for a signal traversing path segments between said clock root and the corresponding circuit components;
   generating a lineage tag for each branching point, at least one of said lineage tags including an indication of a plurality of branching points respectively disposed on a plurality of path segments extending from the corresponding branching point to said clock root;
   determining at least one common branching point in at least two lineage tags associated with said memory device pair; and,
   selectively adjusting the timing delay differential parameter of said memory device pair according to said determined common branching point, whereby delay pessimism is removed for said memory device pair.

9. The method as recited in claim 8, wherein said selectively adjusting the timing delay differential parameter of said memory device pair includes determining path segments in common between said clock root and each of said memory device pair according to clock root and determined common branching points; and, removing any timing difference attributable to said common path segments.

10. The method as recited in claim 8, wherein at least one of said lineage tags is selectively generated to include an identification of all branching points disposed along a path segment extending from the corresponding branching point to said clock root.

11. The method as recited in claim 10, wherein at least one of said lineage tags is selectively generated to include an identification of all branching points disposed along all path segments extending from the corresponding branching point to said clock root.

12. The method as recited in claim 8, wherein said lineage tags are recoverably stored in a hash table, said lineage tags being generated to include pointers to memory locations respectively storing representations of said branching points.

13. The method as recited in claim 8, further comprising identifying a plurality of branching points in common between at least two of said lineage tags.

14. The method as recited in claim 13, wherein the timing delay differential parameter for said memory device pair is selectively adjusted according to said plurality of branching points in common between at least two of said lineage tags.

15. The method as recited in claim 8, wherein the memory device pair includes at least a first register operationally coupled to a data receiving port of at least one second register defining a launch-capture register pair, each said first and second register being commonly coupled to said clock root.

16. A system for expeditious pessimism minimization in timing analysis for a pair of devices clocked according to a common clock root in a circuit design, the system comprising:
   a timing model generator executing to:
      generate a timing model for a circuit design having a clock root and a plurality of clocked devices respectively coupled thereto by a plurality of interconnection points and at least one intermediate circuit component, at least a first and second of said clocked devices being paired in actuation for launch and capture of a data signal therebetween, a first path being defined between said clock root and said first clocked device and a second path being defined between said clock root and said second clocked device; and,
      generate a lineage tag for at least one interconnection point determined to be a branching point, a branching point being defined by an interconnection point having a plurality of incoming or outgoing path segments, at least one of said lineage tags indicating a history of intervening branching points traversed by said first and second paths between said clock root and a corresponding branching point;
   a common ancestor identification module coupled to said timing model generator, said common ancestor identification module being actuated to determine at least one common path portion shared between said first and second paths based upon a comparison of at least one lineage tag from each of said first and second paths;

a common path pessimism reduction module coupled to said common ancestor identification module, said common path pessimism reduction module selectively setting for an interconnect point of at least one of said first and second clocked devices a timing delay parameter compensated for said common path portions shared between said first and second paths, said timing delay parameter indicating a signal propagation delay, whereby delay pessimism is avoided for said paired clocked devices.

17. The system as recited in claim 16, wherein said selective setting of said timing delay parameter for at least one of said first and second clocked devices removes any timing disparity attributable to said common path portion.

18. The system as recited in claim 16, wherein said common ancestor identification module executes to identify a plurality of branching points in common between at least two of said lineage tags.

19. The system as recited in claim 18, wherein said common path pessimism reduction module selectively sets the timing delay parameter for said clocked device pair based on said identified plurality of branching points in common between at least two of said lineage tags.

20. The system as recited in claim 16, wherein said clocked device pair includes at least a first register operationally coupled to a data receiving port of at least one second register defining a launch-capture register pair, each said register being operationally coupled to a common clock root.

* * * * *